(12) United States Patent
Tabata et al.

(10) Patent No.: US 7,048,669 B2
(45) Date of Patent: May 23, 2006

(54) AUTOMATIC TRANSMISSION

(75) Inventors: Atsushi Tabata, Okazaki (JP);
Terufumi Miyazaki, Toyota (JP);
Yasuo Hojo, Nagoya (JP); Akira Hoshino, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 17 days.

(21) Appl. No.: 10/969,187

(22) Filed: Oct. 21, 2004

(65) Prior Publication Data
US 2005/0059525 A1 Mar. 17, 2005

Related U.S. Application Data

(62) Division of application No. 10/273,154, filed on Oct. 18, 2002, now Pat. No. 6,824,492.

(30) Foreign Application Priority Data
Oct. 18, 2001 (JP) ............................. 2001-321040
May 22, 2002 (JP) ............................. 2002-148330

(51) Int. Cl.
*F16H 3/62* (2006.01)
(52) U.S. Cl. ...................... 475/276; 475/277; 475/279; 475/280
(58) Field of Classification Search ................ 475/276, 475/277, 279, 280, 281, 296
See application file for complete search history.

(56) References Cited

U.S. PATENT DOCUMENTS

| 5,030,186 | A | 7/1991 | Asada |
| 5,098,357 | A | 3/1992 | Asada et al. |
| 6,217,474 | B1 | 4/2001 | Ross et al. |
| 6,652,409 | B1 * | 11/2003 | Kao et al. ................ 475/275 |
| 6,767,306 | B1 * | 7/2004 | Raghavan et al. ......... 475/275 |
| 6,808,469 | B1 * | 10/2004 | Tabata et al. ............. 475/276 |

FOREIGN PATENT DOCUMENTS

| GB | 1497622 | * | 1/1978 |
| JP | 402154840 | | 6/1990 |
| JP | HEI08-105496 | | 4/1996 |
| JP | 2956173 (B) | | 7/1999 |
| JP | 2000-199549 | | 7/2000 |
| JP | 2000-266138 | | 9/2000 |
| JP | 2001-82555 | | 3/2001 |
| JP | 2001-173734 | | 6/2001 |
| WO | WO 01/27496 | | 4/2001 |

* cited by examiner

*Primary Examiner*—Ha Ho
(74) *Attorney, Agent, or Firm*—Oblon, Spivak, McClelland, Maier & Neustadt, P.C.

(57) ABSTRACT

The transmission is constructed with a first ring gear and a third ring gear that are firmly connected. A second ring gear and a third carrier are also firmly connected. A second sun gear and a third sun gear are also firmly connected. An input shaft is connectable to a first carrier via a first clutch. The input shaft is connectable to a first sun gear via a second clutch. A third clutch is disposed between the first carrier and a second ring gear. The first carrier is connectable to the second ring gear and the third carrier via the third clutch. A first brake is provided between the first sun gear and a transmission case. A second brake is provided between the transmission case and the first ring gear as well as the third ring gear. A third brake and a one-way clutch are provided in parallel between the first carrier and the transmission case. A fourth brake is provided between the transmission case and the second sun gear as well as the third sun gear.

8 Claims, 30 Drawing Sheets

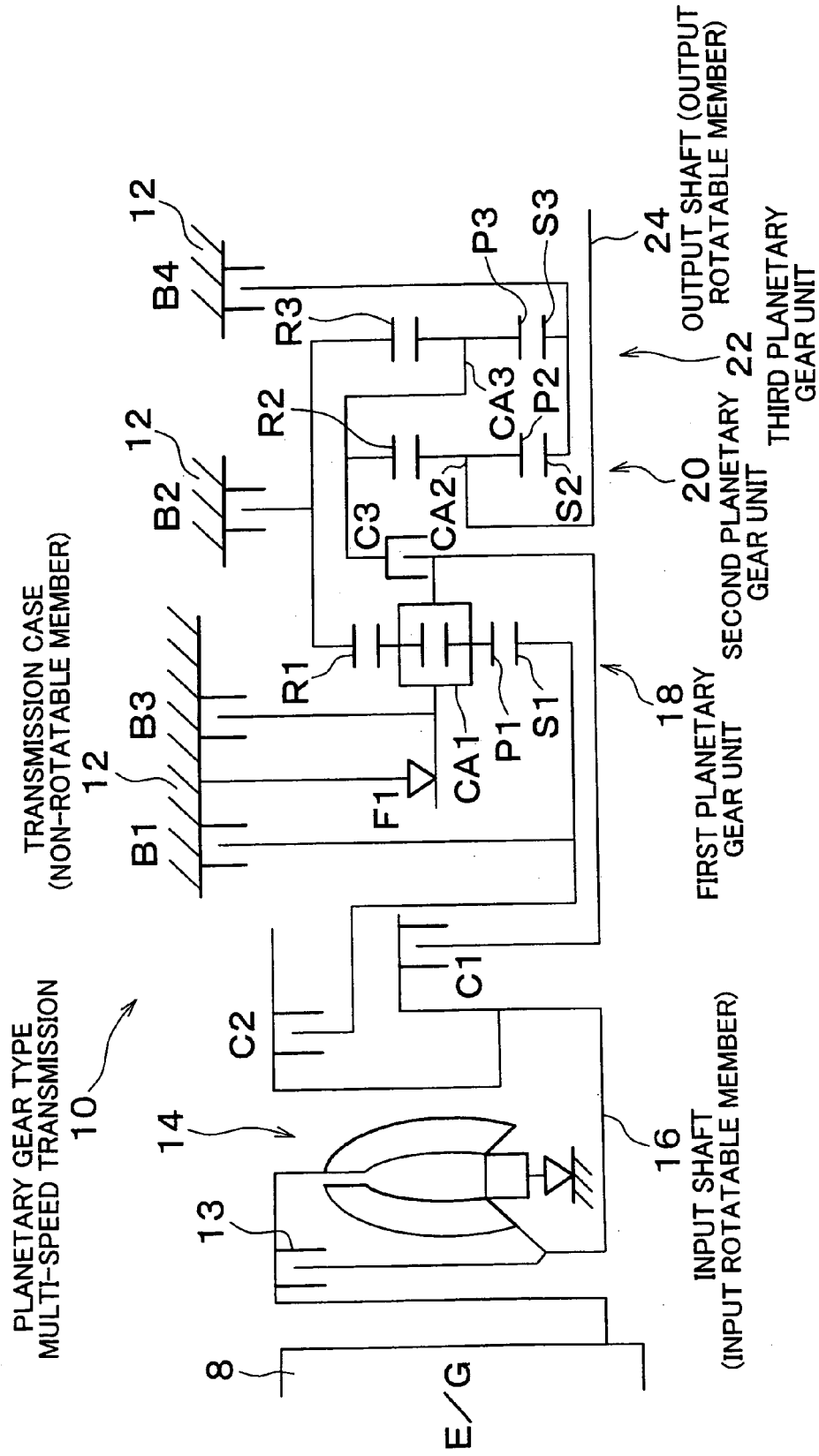

FIG. 2

| | C1 | C2 | C3 | B1 | B2 | B3 | B4 | F1 | GEAR RATIO γ ($\rho_1$=0.4304, $\rho_2$=0.323, $\rho_3$=0.325) | |
|---|---|---|---|---|---|---|---|---|---|---|
| 1st | | ○ | | | | ◎ | ○ | ○ | $(1+\rho_1)(1+\rho_3)/\rho_1$ | 4.073 |
| 2nd | ○ | ○ | ○ | | | | ○ | | $1+\rho_2+\rho_3/\rho_1+\rho_1\rho_3/\rho_1$ | 2.322 |
| 3rd | ○ | ○ | | | | | ○ | | $(1+\rho_2)(1+\rho_3)$ | 1.753 |
| 4th | ○ | ○ | ○ | | | | ○ | | $1+\rho_2$ | 1.323 |
| 5th | ○ | | ○ | ○ | | | | | $1$ | 1.000 |
| 6th | ○ | | ○ | | ○ | | | | $\rho_3(1+\rho_2)/(\rho_1+\rho_3+\rho_3/\rho_2) \times \rho_2$ | 0.756 |
| 7th | ○ | | ○ | | | | | | $(1+\rho_2)/(1+\rho_2/\rho_3+\rho_2)$ | 0.571 |
| R | | ○ | ○ | | | ○ | | | $-\rho_3(1+\rho_2)/\rho_1\rho_2$ | 3.093 |

○ ENGAGED   ◎ ENGAGED DURING ENGINE BRAKE   △ ENGAGED, BUT IRRELEVANT TO POWER TRANSFER

FIG. 5

| | C1 | C2 | C3 | B1 | B2 | B3 | B4 | F1 | GEAR RATIO $\gamma$ ($\rho_1$=0.4304, $\rho_2$=0.325, $\rho_3$=0.323) | 4.073 2.322 1.753 1.323 1.000 0.756 0.571 3.093 |
|---|---|---|---|---|---|---|---|---|---|---|
| 1st | | ○ | | | | ◎ | ○ | ○ | $(1+\rho_3)(1+\rho_2)/\rho_1$ | 4.073 |
| 2nd | | ○ | ○ | | | | ○ | | $1+\rho_3+\rho_2/\rho_1+\rho_2\rho_3/\rho_1$ | 2.322 |
| 3rd | ○ | ○ | ○ | | | | ○ | | $(1+\rho_3)(1+\rho_2)$ | 1.753 |
| 4th | ○ | | ○ | | | | ○ | | $1+\rho_3$ | 1.323 |
| 5th | ○ | ○ | | ○ | | | | | $1$ | 1.000 |
| 6th | ○ | | ○ | | ○ | | | | $\rho_2(1+\rho_3)/(\rho_1+\rho_2+\rho_2/\rho_3)\times\rho_3$ | 0.756 |
| 7th | ○ | | ○ | | | | | | $(1+\rho_3)/(1+\rho_3/\rho_2+\rho_3)$ | 0.571 |
| R | | ○ | ○ | | | ○ | | | $-\rho_2(1+\rho_3)/\rho_1\rho_3$ | 3.093 |

○ ENGAGED    ◎ ENGAGED DURING ENGINE BRAKE    △ ENGAGED, BUT IRRELEVANT TO POWER TRANSFER

FIG. 8

| | C1 | C2 | C3 | B1 | B2 | B3 | B4 | F1 | GEAR RATIO γ ($\rho_1$=0.5696, $\rho_2$=0.323, $\rho_3$=0.325) | |
|---|---|---|---|---|---|---|---|---|---|---|
| 1st | | ○ | | | | ⊚ | ○ | ○ | $(1+\rho_2)(1+\rho_3)/(1-\rho_1)$ | 4.073 |
| 2nd | | ○ | ○ | | | | ○ | | $1+\rho_2+\rho_3/(1-\rho_1)+\rho_2\rho_3/(1-\rho_1)$ | 2.322 |
| 3rd | ○ | ○ | | | | | ○ | | $(1+\rho_2)(1+\rho_3)$ | 1.753 |
| 4th | ○ | | ○ | | | | ○ | | | 1.323 |
| 5th | ○ | ○ | ○ | | | | | | $1+\rho_2$ | 1.000 |
| 6th | ○ | | ○ | ○ | | | | | 1 | 0.756 |
| 7th | ○ | | ○ | | ○ | | | | $\rho_3(1+\rho_2)/(1-\rho_1+\rho_3+\rho_3/\rho_2)\times\rho_2$ | 0.571 |
| R | | ○ | ○ | | | ○ | | | $(1+\rho_2)/(1+\rho_2/\rho_3+\rho_2)$ | 3.093 |

○ ENGAGED  ⊚ ENGAGED DURING ENGINE BRAKE  △ ENGAGED, BUT IRRELEVANT TO POWER TRANSFER

FIG. 11

| | C1 | C2 | C3 | B1 | B2 | B3 | B4 | F1 | GEAR RATIO γ ($\rho_1$=0.5696, $\rho_2$=0.325, $\rho_3$=0.323) |
|---|---|---|---|---|---|---|---|---|---|
| 1st | | ○ | | | | ◎ | | ○ | $(1+\rho_3)(1+\rho_2)/(1-\rho_1)$ — 4.073 |
| 2nd | | ○ | ○ | | | | ○ | | $1+\rho_3+\rho_2/(1-\rho_1)+\rho_2\rho_3/(1-\rho_1)$ — 2.322 |
| 3rd | ○ | ○ | | | | | ○ | | $(1+\rho_3)(1+\rho_2)$ — 1.753 |
| 4th | ○ | | ○ | | | | ○ | | $1+\rho_3$ — 1.323 |
| 5th | ○ | | ○ | ○ | | | | | 1 — 1.000 |
| 6th | ○ | | ○ | | ○ | | | | $\rho_2(1+\rho_3)/(1-\rho_1+\rho_2+\rho_2/\rho_3)\times\rho_3$ — 0.756 |
| 7th | ○ | | ○ | | | | | | $(1+\rho_3)/(1+\rho_3/\rho_2+\rho_3)$ — 0.571 |
| R | | ○ | ○ | | | ○ | | | $-\rho_2(1+\rho_3)/(1-\rho_1)\rho_3$ — 3.093 |

○ ENGAGED    ◎ ENGAGED DURING ENGINE BRAKE    △ ENGAGED, BUT IRRELEVANT TO POWER TRANSFER

FIG. 14

| | C1 | C2 | C3 | C4 | B2 | B3 | B4 | F1 | GEAR RATIO γ ($\rho_1$=0.4177, $\rho_2$=0.300, $\rho_3$=0.377) |
|---|---|---|---|---|---|---|---|---|---|
| 1st | | ○ | | | | ◎ | ○ | ○ | $(1+\rho_2)(1+\rho_3)/\rho_1$ = 4.285 |
| 2nd | | ○ | ○ | | | | ○ | | $1+\rho_2+\rho_3/\rho_1+\rho_2\rho_3/\rho_1$ = 2.473 |
| 3rd | | ○ | | ○ | | | ○ | | $(1+\rho_2)(1+\rho_3)$ = 1.790 |
| 4th | ○ | | | △ | | | ○ | | 1.300 |
| 5th | ○ | ○ | | ○ | | | | | $1+\rho_2$ = 1.000 |
| 6th | ○ | ○ | | | | ○ | | | 1 |
| 7th | ○ | | | | ○ | △ | | | $(1+\rho_2)\rho_3/(\rho_3+\rho_2+\rho_2\rho_3-\rho_1\rho_2)$ = 0.737 |
| | | | | | | | | | $(1+\rho_2)/(1+\rho_2/\rho_3+\rho_2)$ = 0.620 |
| R | | ○ | ○ | | | ○ | | | $-\rho_3(1+\rho_2)/\rho_1\rho_2$ = 3.910 |

○ ENGAGED    ◎ ENGAGED DURING ENGINE BRAKE    △ ENGAGED, BUT IRRELEVANT TO POWER TRANSFER

FIG. 17

| | C1 | C2 | C3 | C4 | B2 | B3 | B4 | F1 | GEAR RATIO γ ($\rho_1$=0.4177, $\rho_2$=0.377, $\rho_3$=0.300) |
|---|---|---|---|---|---|---|---|---|---|
| 1st | | ○ | | | | ◎ | ○ | ○ | $(1+\rho_3)(1+\rho_2)/\rho_1$ = 4.285 |
| 2nd | | ○ | ○ | | | | ○ | | $1+\rho_3+\rho_2/\rho_1+\rho_2\rho_3/\rho_1$ = 2.473 |
| 3rd | | ○ | | ○ | | | ○ | | $(1+\rho_3)(1+\rho_2)$ = 1.790 |
| 4th | ○ | | | △ | | | ○ | | $1+\rho_3$ = 1.300 |
| 5th | ○ | ○ | | ○ | | | | | 1 = 1.000 |
| 6th | ○ | ○ | | | | ○ | | | $(1+\rho_3)\rho_2/(\rho_2+\rho_3+\rho_2\rho_3-\rho_1\rho_3)$ = 0.737 |
| 7th | ○ | | | | ○ | △ | | | $(1+\rho_3)/(1+\rho_3/\rho_2+\rho_3)$ = 0.620 |
| R | | ○ | ○ | | | ○ | | | $\rho_2(1+\rho_3)/\rho_1\rho_3$ = 3.910 |

○ ENGAGED  ◎ ENGAGED DURING ENGINE BRAKE  △ ENGAGED, BUT IRRELEVANT TO POWER TRANSFER

FIG. 20

| | C1 | C2 | C3 | C4 | B1 | B2 | B3 | B4 | F1 | GEAR RATIO γ ($\rho_1$=0.4304, $\rho_2$=0.323, $\rho_3$=0.325) | |
|---|---|---|---|---|---|---|---|---|---|---|---|
| 1st | | ○ | | | | | ◎ | ○ | ○ | $(1+\rho_1)(1+\rho_3)/\rho_1$ | 4.073 |
| 2nd | | ○ | ○ | | | | | ○ | | $1+\rho_2+\rho_3/\rho_1+\rho_1\rho_3/\rho_1$ | 2.322 |
| 3rd | | ○ | | ○ | | | | ○ | | $(1+\rho_2)(1+\rho_3)$ | 1.753 |
| 4th | ○ | | | △ | | | | ○ | | $1+\rho_2$ | 1.323 |
| 5th | ○ | | ○ | ○ | | | | | | 1 | 1.000 |
| 6th | ○ | | ○ | | ○ | | | | | $\rho_3(1+\rho_2)/(\rho_1+\rho_3+\rho_3/\rho_2) \times \rho_2$ | 0.756 |
| 7th | ○ | | △ | | | ○ | | | | $(1+\rho_2)/(1+\rho_2/\rho_3+\rho_2)$ | 0.571 |
| R | | ○ | ○ | ○ | | | ○ | | | $-\rho_3(1+\rho_2)/\rho_1\rho_2$ | 3.093 |

○ ENGAGED    ◎ ENGAGED DURING ENGINE BRAKE    △ ENGAGED, BUT IRRELEVANT TO POWER TRANSFER

FIG. 23

| | C1 | C2 | C3 | C4 | B1 | B2 | B3 | B4 | F1 | GEAR RATIO γ ($\rho_1=0.4304$, $\rho_2=0.325$, $\rho_3=0.323$) |
|---|---|---|---|---|---|---|---|---|---|---|
| 1st | | ○ | | | | | ◎ | ○ | ○ | $(1+\rho_3)(1+\rho_2)/\rho_1$ — 4.073 |
| 2nd | | ○ | ○ | | | | | ○ | | $1+\rho_3+\rho_2/\rho_1+\rho_2\rho_3/\rho_1$ — 2.322 |
| 3rd | | ○ | | ○ | | | | ○ | | $(1+\rho_3)(1+\rho_2)$ — 1.753 |
| 4th | ○ | | | △ | | | | ○ | | $1+\rho_3$ — 1.323 |
| 5th | ○ | | ○ | ○ | | | | | | 1 — 1.000 |
| 6th | ○ | | ○ | | ○ | | | | | $\rho_2(1+\rho_3)/(\rho_1+\rho_2+\rho_2/\rho_3)\times\rho_3$ — 0.756 |
| 7th | ○ | | △ | | | ○ | | | | $(1+\rho_3)/(1+\rho_3/\rho_2+\rho_3)$ — 0.571 |
| R | | ○ | ○ | | | | ○ | | | $-\rho_2(1+\rho_3)/\rho_1\rho_3$ — 3.093 |

○ ENGAGED    ◎ ENGAGED DURING ENGINE BRAKE    △ ENGAGED, BUT IRRELEVANT TO POWER TRANSFER

FIG. 26

| | C1 | C2 | C3 | B1 | B2 | B3 | B4 | F1 | GEAR RATIO γ ($\rho_1$=0.756, $\rho_2$=0.323, $\rho_3$=0.325) | |
|---|---|---|---|---|---|---|---|---|---|---|
| 1st | | ○ | | | | ◎ | ○ | ○ | $(1+\rho_1)(1+\rho_2)(1+\rho_3)/\rho_1$ | 4.073 |
| 2nd | | ○ | ○ | | | | ○ | | $(1+\rho_2)(\rho_1+\rho_3+\rho_1\rho_3)/\rho_1$ | 2.322 |
| 3rd | ○ | ○ | | | | | ○ | | $(1+\rho_2)(1+\rho_3)$ | 1.753 |
| 4th | ○ | | ○ | | | | ○ | | $1+\rho_2$ | 1.323 |
| 5th | ○ | ○ | ○ | | | | | | 1 | 1.000 |
| 6th | ○ | | ○ | ○ | | | | | $(1+\rho_1)(1+\rho_2)\rho_3/[\rho_3+\rho_1\rho_3+\rho_2(1+\rho_3)(1+\rho_1)-\rho_2]$ | 0.756 |
| 7th | ○ | | ○ | | ○ | | | | $(1+\rho_2)\rho_3/[\rho_3+\rho_2(1+\rho_3)]$ | 0.571 |
| R | | ○ | ○ | | | ○ | | | $-(1+\rho_1)(1+\rho_2)\rho_3/\rho_1\rho_2$ | 3.093 |

○ ENGAGED   ◎ ENGAGED DURING ENGINE BRAKE   △ ENGAGED, BUT IRRELEVANT TO POWER TRANSFER

FIG. 29

| | C1 | C2 | C3 | B1 | B2 | B3 | B4 | F1 | GEAR RATIO γ ($\rho_1$=0.756, $\rho_2$=0.323, $\rho_3$=0.325) | |
|---|---|---|---|---|---|---|---|---|---|---|
| 1st | | O | | | | ◎ | | O | $(1+\rho_1)(1+\rho_2)(1+\rho_3)/\rho_1$ | 4.073 |
| 2nd | | O | O | | | | O | | $(1+\rho_3)(\rho_1+\rho_3+\rho_1\rho_2)/\rho_1$ | 2.322 |
| 3rd | O | O | | | | | O | | $(1+\rho_2)(1+\rho_3)$ | 1.753 |
| 4th | O | | O | | | | O | | $1+\rho_3$ | 1.323 |
| 5th | O | | O | | | | O | | $1$ | 1.000 |
| 6th | O | | O | O | | | | | $(1+\rho_1)(1+\rho_3)\rho_2/[\rho_2+\rho_1\rho_2+\rho_3(1+\rho_2)(1+\rho_1)-\rho_3]$ | 0.756 |
| 7th | O | | O | | O | | | | $(1+\rho_3)\rho_2/[\rho_2+\rho_3(1+\rho_2)]$ | 0.571 |
| R | | O | O | | | O | | | $-(1+\rho_1)(1+\rho_3)\rho_2/\rho_1\rho_3$ | 3.093 |

O ENGAGED   ◎ ENGAGED DURING ENGINE BRAKE   △ ENGAGED, BUT IRRELEVANT TO POWER TRANSFER

AUTOMATIC TRANSMISSION

This application is based upon and is a Div. of U.S. Ser. No. 10/273,154, filed Oct. 18, 2002, now U.S. Pat. No. 6,824,492 and under 35 U.S.C. §119 from Japanese Patent Application Nos. 2001-321040 filed Oct. 18, 2001 and 2002-148330 filed May 22, 2002.

BACKGROUND OF THE INVENTION

1. Field of the Invention

The invention relates to an automatic transmission provided between an engine and a drive wheel in vehicles such as motor vehicles, railway vehicles, etc.

2. Description of the Related Art

Many vehicles adopt planetary gear-type multi-speed transmissions suitable for selecting an appropriate speed from a plurality of predetermined transmission speed ratios or gear speeds. With regard to such planetary gear-type multi-speed transmissions, it is desirable that the construction be simple and small in size, and that a great range of transmission gear ratios and speeds be allowed, and that the selectable transmission gear ratios change in a geometric progression or a similar fashion.

Planetary gear-type multi-speed transmissions capable of shifting speeds in seven steps have been proposed. Examples of such transmissions are planetary gear-type multi-speed transmissions in the third embodiment (FIGS. 5 and 6) and the fourth embodiment (FIGS. 7 and 8) in Japanese Patent Application Laid-Open No. 2000-266138. These transmissions allow great ranges of transmission gear ratios and speeds. However, since the transmissions substantially adopt four sets of planetary gear units, the transmissions have drawbacks of increased lengths and therefore degraded vehicle installability.

SUMMARY OF THE INVENTION

It is an object of the invention to provide an automatic transmission that allows an increased range of transmission gear ratios or speeds.

A first aspect of the invention relates to a type of automatic transmission that changes rotational speed of an input rotatable element in a stepwise manner and outputs rotation of an output rotatable member. This automatic transmission has a first planetary gear unit, a second planetary gear unit, and a third planetary gear unit. Where five rotatable elements formed based on interconnection of some of a first sun gear, a first carrier and a first ring gear of the first planetary gear unit, and a second sun gear, a second carrier and a second ring gear of the second planetary gear unit, and a third sun gear, a third carrier and a third ring gear of the third planetary gear unit are termed a first rotatable element, a second rotatable element, a third rotatable element, a fourth rotatable element, and a fifth rotatable element from an end toward another end in an alignment graph that indicates rotational speeds of the five rotatable elements, the first to fifth rotatable elements are arranged as follows. The first rotatable element is selectively connectable to the input rotatable element via a second clutch, and is selectively connectable to a non-rotatable member via a first brake. The second rotatable element is selectively connectable to the non-rotatable member via a second brake. The third rotatable element is selectively connectable to the input rotatable element via a first clutch, and is selectively connectable to the non-rotatable member via a third brake, and a portion of the third rotatable element connected to the first clutch and the third brake is selectively connectable to another portion of the third rotatable element via a third clutch. The fourth rotatable element is connected to the output rotatable member. The fifth rotatable element is selectively connectable to the non-rotatable member via a fourth brake. This automatic transmission establishes gear speeds as follows. Engagement of the second clutch, the third brake and the fourth brake establishes a first gear speed having a greatest transmission gear ratio. Engagement of the second clutch, the third clutch and the fourth brake establishes a second gear speed of a transmission gear ratio that is smaller than the transmission gear ratio of the first gear speed. Engagement of the first clutch, the second clutch and the fourth brake establishes a third gear speed of a transmission gear ratio that is smaller than the transmission gear ratio of the second gear speed. Engagement of the first clutch, the third clutch and the fourth brake establishes a fourth gear speed of a transmission gear ratio that is smaller than the transmission gear ratio of the third gear speed. Engagement of the first clutch, the second clutch and the third clutch establishes a fifth gear speed of a transmission gear ratio that is smaller than the transmission gear ratio of the fourth gear speed. Engagement of the first clutch, the third clutch and the first brake establishes a sixth gear speed of a transmission gear ratio that is smaller than the transmission gear ratio of the fifth gear speed. Engagement of the first clutch, the third clutch and the second brake establishes a seventh gear speed of a transmission gear ratio that is smaller than the transmission gear ratio of the sixth gear speed.

Therefore, the provision of the three planetary gear units, that is, the first planetary gear unit, the second planetary gear unit and the third planetary gear unit, achieves as broad a range of gear ratios as sevenforward speeds. Hence, it is possible to provide a small-size vehicular planetary gear type multi-speed transmission capable of achieving good high-speed running performance and good uphill starting performance.

A second aspect of the invention relates to a type of automatic transmission that changes rotational speed of an input rotatable element in speed in a stepwise manner and outputs rotation from an output rotatable member. This automatic transmission has a first planetary gear unit, a second planetary gear unit, and a third planetary gear unit. Where five rotatable elements formed based on interconnection of some of a first sun gear, a first carrier and a first ring gear of the first planetary gear unit, and a second sun gear, a second carrier and a second ring gear of the second planetary gear unit, and a third sun gear, a third carrier and a third ring gear of the third planetary gear unit are termed a first rotatable element, a second rotatable element, a third rotatable element, a fourth rotatable element, and a fifth rotatable element from an end toward another end in an alignment graph that indicates rotational speeds of the five rotatable elements, the first to fifth rotatable elements are arranged as follows. The first rotatable element is selectively connectable to the input rotatable element via a second clutch. The second rotatable element is selectively connectable to a non-rotatable member via a second brake. The third rotatable element is selectively connectable to the first rotatable element via a fourth clutch, and is selectively connectable to the non-rotatable member via a third brake, and is selectively connectable to the input rotatable element via a first clutch. A portion of the third rotatable element connected to the fourth clutch and the third brake and a portion of the third rotatable element connected to the first clutch are selectively connectable to each other via a third clutch. The fourth rotatable element is connected to the output rotatable member. The fifth rotatable element is selectively connectable to the non-rotatable member via a fourth brake. This automatic transmission establishes gear speeds as follows. Engagement of the second clutch, the third brake and the fourth brake establishes a first gear speed having a greatest transmission gear ratio. Engagement of the second clutch, the third clutch and the fourth brake establishes a second gear speed of a transmission gear ratio that is smaller than the transmission gear ratio of the first gear speed. Engagement of the second clutch, the fourth clutch and the fourth brake establishes a third gear speed of a transmission gear ratio that is smaller than the transmission gear ratio of the second gear speed. Engagement of the first clutch and the fourth brake establishes a fourth gear speed of a transmission gear ratio that is smaller than the transmission gear ratio of the third gear speed. Engagement of at least three of the first clutch, the second clutch, the third clutch and the fourth clutch establishes a fifth gear speed of a transmission gear ratio that is smaller than the transmission gear ratio of the fourth gear speed. Engagement of the first clutch, the second clutch and the third brake establishes a sixth gear speed of a transmission gear ratio that is smaller than the transmission gear ratio of the fifth gear speed. Engagement of the first clutch and the second brake establishes a seventh gear speed of a transmission gear ratio that is smaller than the transmission gear ratio of the sixth gear speed.

Therefore, the provision of the three planetary gear units, that is, the first planetary gear unit, the second planetary gear unit and the third planetary gear unit, achieves as broad a range of gear ratios as seven forward speeds. Hence, it is possible to provide a small-size vehicular planetary gear type multi-speed transmission capable of achieving good high-speed running performance and good uphill starting performance.

A third aspect of the invention relates to a type of automatic transmission that changes rotational speed of an input rotatable element in a stepwise manner and outputs rotation from an output rotatable member. This automatic transmission has a first planetary gear unit, a second planetary gear unit, and a third planetary gear unit. Where five rotatable elements formed based on interconnection of some of a first sun gear, a first carrier and a first ring gear of the first planetary gear unit, and a second sun gear, a second carrier and a second ring gear of the second planetary gear unit, and a third sun gear, a third carrier and a third ring gear of the third planetary gear unit are termed a first rotatable element, a second rotatable element, a third rotatable element, a fourth rotatable element, and a fifth rotatable element from an end toward another end in an alignment graph that indicates rotational speeds of the five rotatable elements, the first to fifth rotatable elements are arranged as follows. The first rotatable element is selectively connectable to the input rotatable element via a second clutch, and is selectively connectable to a non-rotatable member via a first brake. The second rotatable element is selectively connectable to the non-rotatable member via a second brake. The third rotatable element is selectively connectable to the first rotatable element via a fourth clutch, and is selectively connectable to the non-rotatable member via a third brake, and is selectively connectable to the input rotatable element via a first clutch. A portion of the third rotatable element connected to the fourth clutch and the third brake and a portion of the third rotatable element connected to the first clutch are selectively connectable to each other via a third clutch. The fourth rotatable element is connected to the output rotatable member. The fifth rotatable element is selectively connectable to the non-rotatable member via a fourth brake. This automatic transmission establishes transmission gear speeds as follows. Engagement of the second clutch, the third brake and the fourth brake establishes a first gear speed having a greatest transmission gear ratio. Engagement of the second clutch, the third clutch and the fourth brake establishes a second gear speed of a transmission gear ratio that is smaller than the transmission gear ratio of the first gear speed. Engagement of the second clutch, the fourth clutch and the fourth brake establishes a third gear speed of a transmission gear ratio that is smaller than the transmission gear ratio of the second gear speed. Engagement of the first clutch and the fourth brake establishes a fourth gear speed of a transmission gear ratio that is smaller than the transmission gear ratio of the third gear speed. Engagement of at least three of the first clutch, the second clutch, the third clutch and the fourth clutch establishes a fifth gear speed of a transmission gear ratio that is smaller than the transmission gear ratio of the fourth gear speed. Engagement of the first clutch, the third clutch and the first brake establishes a sixth gear speed of a transmission gear ratio that is smaller than the transmission gear ratio of the fifth gear speed. Engagement of the first clutch and the second brake establishes a seventh gear speed of a transmission gear ratio that is smaller than the transmission gear ratio of the sixth gear speed.

Therefore, the provision of the three planetary gear units, that is, the first planetary gear unit, the second planetary gear unit and the third planetary gear unit, achieves as broad a range of gear ratios as seven forward speeds. Hence, it is possible to provide a small-size vehicular planetary gear type multi-speed transmission capable of achieving good high-speed running performance and good uphill starting performance.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 1 is a skeleton diagram illustrating a construction of portions of a vehicular planetary gear type multi-speed transmission in accordance with a first embodiment of the invention;

FIG. 2 is a table indicating relationships between the gear speeds of the vehicular planetary gear type multi-speed transmission of the first embodiment and actuation of hydraulically driven friction engagement devices needed to establish the transmission gear speeds;

FIG. 5 is a table indicating relationships between the gear speeds of the vehicular planetary gear type multi-speed transmission of the second embodiment and actuation of hydraulically driven friction engagement devices needed to establish the transmission gear speeds, corresponding to FIG. 2;

FIG. 8 is a table indicating relationships between the gear speeds of the vehicular planetary gear type multi-speed transmission of the third embodiment and actuation of hydraulically driven friction engagement devices needed to establish the transmission gear speeds, corresponding to FIG. 2;

FIG. 11 is a table indicating relationships between the gear speeds of the vehicular planetary gear type multi-speed transmission of the fourth embodiment and actuation of hydraulically driven friction engagement devices needed to establish the transmission gear speeds, corresponding to FIG. 2;

FIG. 14 is a table indicating relationships between the gear speeds of the vehicular planetary gear type multi-speed transmission of the fifth embodiment and actuation of hydraulically driven friction engagement devices needed to establish the transmission gear speeds, corresponding to FIG. 2;

FIG. 17 is a table indicating relationships between the gear speeds of the vehicular planetary gear type multi-speed transmission of the sixth embodiment and actuation of hydraulically driven friction engagement devices needed to establish the transmission gear speeds, corresponding to FIG. 2;

FIG. 20 is a table indicating relationships between the gear speeds of the vehicular planetary gear type multi-speed transmission of the seventh embodiment and actuation of hydraulically driven friction engagement devices needed to establish the transmission gear speeds, corresponding to FIG. 2;

FIG. 23 is a table indicating relationships between the gear speeds of the vehicular planetary gear type multi-speed transmission of the eighth embodiment and actuation of hydraulically driven friction engagement devices needed to establish the transmission gear speeds, corresponding to FIG. 2;

FIG. 26 is a table indicating relationships between the gear speeds of the vehicular planetary gear type multi-speed transmission of the ninth embodiment and actuation of hydraulically driven friction engagement devices needed to establish the transmission gear speeds, corresponding to FIG. 2;

FIG. 29 is a table indicating relationships between the gear speeds of the vehicular planetary gear type multi-speed transmission of the tenth embodiment and actuation of hydraulically driven friction engagement devices needed to establish the transmission gear speeds, corresponding to FIG. 2.

DETAILED DESCRIPTION OF PREFERRED EMBODIMENTS

Figure 3:
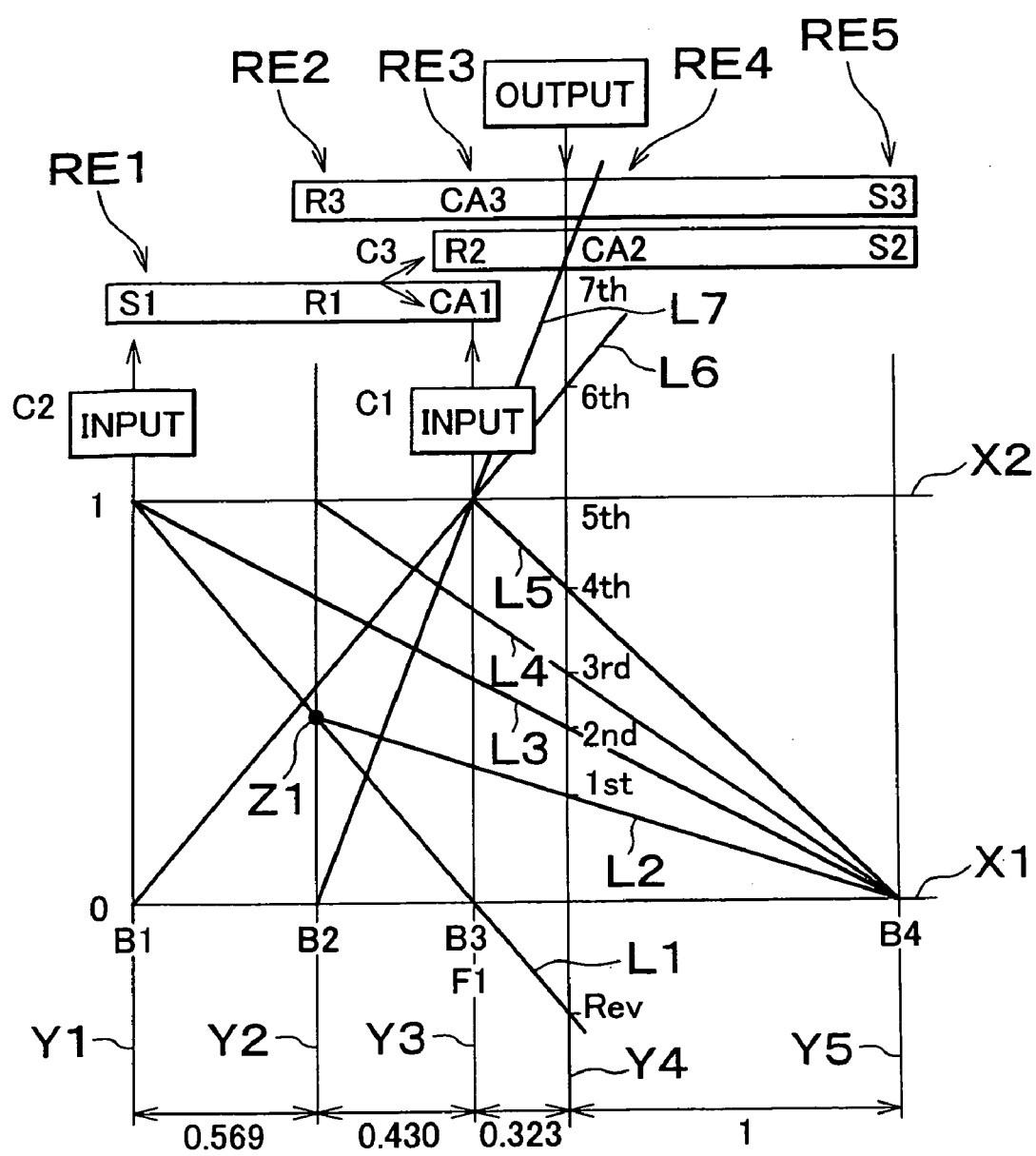
FIG. 3 is an alignment graph illustrating operation of the vehicular planetary gear type multi-speed transmission of the first embodiment.

A first embodiment of the invention will be described in detail below with reference to drawings. FIG. 1 is a skeleton diagram illustrating the construction of a vehicular planetary gear-type multi-speed transmission (hereinafter, simply referred to as "transmission") 10 that is suitable as a vehicular automatic transmission. Referring to FIG. 1, the transmission 10 is provided between an engine 8 and drive wheels (not shown). The transmission 10 transfers a power from the engine 8 to the drive wheels. A transmission case (non-rotatable member) 12 of the transmission 10 is mounted on a vehicle body. The transmission case 12 contains a torque converter 14 equipped with a lockup clutch 13, the input shaft 16 connected to the torque converter 14, a first planetary gear unit 18, a second planetary gear unit 20, a third planetary gear unit 22, and the output shaft 24, which are sequentially and concentrically disposed on a common axis. The torque converter 14 is connected to a crankshaft (not shown) of an engine 8. In this embodiment, the input shaft 16 can be regarded as an input rotatable member in the invention. The output shaft 24 can be regarded as an output rotatable member in the invention. The transmission case 12 can be regarded as a non-rotatable member in the invention. The transmission 10 is constructed symmetrically about an axis thereof. In the skeleton diagram of FIG. 1, therefore, a lower portion of the transmission 10 is not shown.

The first planetary gear unit 18 is formed by a double-pinion type planetary gear unit. The second planetary gear unit 20 and the third planetary gear unit 22 are each formed by a single-pinion type planetary gear unit. The first planetary gear unit 18 has a first sun gear S1, a plurality of pairs of first planetary gears P1 meshed with each other, a first carrier CA1 supporting the first planetary gears P1 in such a manner as to allow rotation and revolution of the first planetary gears P1, and a first ring gear R1 that is mesh-connected to the first sun gear S1 via the first planetary gears P1. The first planetary gear unit 18 has a predetermined gear ratio ρ1, for example, a ratio of about "0.4304". The second planetary gear unit 20 has a second sun gear S2, second planetary gears P2, a second carrier CA2 supporting the second planetary gears P2 in such a manner as to allow rotation and revolution of the second planetary gears P2, and a second ring gear R2 that is mesh-connected to the second sun gear S2 via the second planetary gears P2. The second planetary gear unit 20 has a predetermined gear ratio ρ2, for example, a ratio of about "0.323". The third planetary gear unit 22 has a third sun gear S3, third planetary gears P3, a third carrier CA3 supporting the third planetary gears P3 in such a manner as to allow rotation and revolution of the third planetary gears P3, and a third ring gear R3 that is mesh-connected to the third sun gear S3 via the third planetary gears P3. The third planetary gear unit 22 has a predetermined gear ratio ρ3, for example, a ratio of about "0.325". Assuming that the number of teeth of the first sun gear S1 is ZR1, and the number of teeth of the first ring gear R1 is ZR1, and the number of teeth of the second sun gear S2 is ZS2, and the number of teeth of the second ring gear R2 is ZR2, and the number of teeth of the third sun gear S3 is ZS3, and the number of teeth of the third ring gear R3 is ZR3, the aforementioned gear ratio ρ1 can be expressed as ZS1/ZR1, and the gear ratio ρ2 can be expressed as ZS2/ZR2, and the gear ratio ρ3 can be expressed as ZS3/ZR3. Since the first planetary gear unit 18 is a double-pinion type planetary gear unit, the gear ratio ρ1 of the first planetary gear unit 18 can be set at a great value, which facilitates the gear ratio setting.

In the transmission 10, the first ring gear R1 and the third ring gear R3 are firmly connected to each other. Likewise, the second ring gear R2 and the third carrier CA3 are firmly connected. The second sun gear S2 and the third sun gear S3 are firmly connected. The input shaft (input rotatable member) 16 is selectively connectable to the first carrier CA1 via a first clutch C1. The input shaft 16 is selectively connectable to the first sun gear S1 via a second clutch C2. A third clutch C3 is disposed between the first carrier CA1 and the second ring gear R2 so that the first carrier CA1 is selectively connectable to the second ring gear R2 and the third carrier CA3 via the third clutch C3. A first brake B1 is provided between the first sun gear S1 and the transmission case (non-rotatable member) 12. A second brake B2 is provided between the transmission case 12 and the first ring gear R1 (as well as the third ring gear R3). A third brake B3 and a one-way clutch F1 are disposed in parallel between the transmission case 12 and the first carrier CA1. A fourth brake B4 is provided between the transmission case 12 and the second sun gear S2 as well as the third sun gear S3.

The first clutch C1, the second clutch C2, the third clutch C3, the first brake B1, the second brake B2, the third brake B3, the fourth brake B4 are hydraulically actuated friction engagement devices that are typically employed in conventional vehicular automatic transmissions. Such a friction engagement device is, for example, a multi-plate wet type device in which stacked friction plates are pressed against one another by a hydraulic actuator, or a band brake type device in which one or two bands disposed along an outer peripheral surface of a rotatable drum is pulled tight at one end by a hydraulic actuator. The friction engagement device serves to selectively connect two members between which the device is disposed. The one-way clutch F1 provided in parallel to the third brake B3 is also an engagement device, that is, one which can serve as a third brake. Instead of providing both the one-way clutch F1 and the third brake B3, it is possible to provide only one of the two devices.

In the transmission 10 constructed as described above, one of the first to seventh gear speeds or a reverse gear speed is selectively achieved by simultaneously engaging two or three engagement devices selected from the first clutch C1, the second clutch C2, the third clutch C3, the first brake B1, the second brake B2, the third brake B3, and the fourth brake B4, for example, as indicated in an engagement table of FIG. 2. The transmission 10 is designed so that the transmission gear ratio γ(=input shaft rotational speed Nin/output shaft rotational speed Nout) is shifted substantially in a geometric progression in a sequence of the gear speeds.

Specifically, referring to FIG. 2, if the second clutch C2, the third brake B3 and the fourth brake B4 are engaged, so that the input shaft 16 and the first sun gear S1 are connected, and so that the first carrier CA1 and the transmission case 12 are connected, and so that the transmission case 12 and the second sun gear S2 as well as the third sun gear S3 are connected, respectively, then the first gear speed of a gear ratio γ1 is achieved. The transmission gear ratio γ1 has a maximum ratio value, for example, "4.073". If the second clutch C2, the third clutch C3 and the fourth brake B4 are engaged, so that connection is established between the input shaft 16 and the first sun gear S1, and between the first carrier CA1 and the second ring gear R2 as well as the third carrier CA3, and between the transmission case 12 and the second sun gear S2 as well as the third sun gear S3, respectively, then the second gear speed of a transmission gear ratio γ2 that is smaller than the gear ratio γ1 of the first gear speed is established. The gear ratio γ2 of the second speed is, for example, about "2.322". If the first clutch C1, the second clutch C2 and the fourth brake B4 are engaged, so that connection is established between the input shaft 16 and the first carrier CA1, and between the input shaft 16 and the first sun gear S1, and between the transmission case 12 and the second sun gear S2 as well as the third sun gear S3, respectively, the third gear speed of a gear ratio γ3 that is smaller than the gear ratio γ2 of the second gear speed is established. The gear ratio γ3 of the third speed is, for example, about "1.753". If the first clutch C1, the third clutch C3 and the fourth brake B4 are engaged, so that connection is established between the input shaft 16 and the first carrier CA1, and between the first carrier CA1 and the second ring gear R2 as well as the third carrier CA3, and between the transmission case 12 and the second sun gear S2 as well as the third sun gear S3, respectively, the fourth gear speed of a gear ratio γ4 that is smaller than the gear ratio γ3 of the third gear speed is established. The gear ratio γ4 of the fourth speed is, for example, about "1.323". If the first clutch C1, the second clutch C2 and the third clutch C3 are engaged, so that connection is established between the input shaft 16 and the first carrier CA1, and between the input shaft 16 and the first sun gear S1, and between the first carrier CA1 and the second ring gear R2 as well as the third carrier CA3, respectively, the fifth gear speed of a gear ratio γ5 that is smaller than the gear ratio γ4 of the fourth gear speed is established. The gear ratio γ5 of the fifth speed is, for example, about "1.000". If the first clutch C1, the third clutch C3 and the first brake B1 are engaged, so that connection is established between the input shaft 16 and the first carrier CA1, and between the first carrier CA1 and the second ring gear R2 as well as the third carrier CA3, and between the first sun gear S1 and the transmission case 12, respectively, the sixth gear speed of a gear ratio γ6 that is smaller than the gear ratio γ5 of the fifth gear speed is established. The gear ratio γ6 of the sixth speed is, for example, about "0.756". If the first clutch C1, the third clutch C3 and the second brake B2 are engaged, so that connection is established between the input shaft 16 and the first carrier CA1, and between the first carrier CA1 and the second ring gear R2 as well as the third carrier CA3, and between the transmission case 12 and the first ring gear R1 as well as the third ring gear R3, respectively, the seventh gear speed of a gear ratio γ7 that is smaller than the gear ratio γ6 of the sixth gear speed is established. The gear ratio γ7 of the seventh speed is, for example, about "0.571". If the second clutch C2, the third clutch C3 and the third brake B3 are engaged, so that connection is established between the input shaft 16 and the first sun gear S1, and between the first carrier CA1 and the second ring gear R2 as well as the third carrier CA3, and between the first carrier CA1 and the transmission case 12, respectively, the reverse gear speed of a gear ratio γR that is between the gear ratio γ1 of the first speed and the gear ratio γ2 of the second speed is established. The gear ratio γR of the reverse speed is, for example, about "3.093". The gear ratio ρ1 of the first planetary gear unit 18, the gear ratio ρ2 of the second planetary gear unit 20, and the gear ratio ρ3 of the third planetary gear unit 22 are set so that the aforementioned transmission gear ratios are achieved.

In the transmission 10, the ratio of the transmission gear ratio γ1 of the first gear speed to the transmission gear ratio γ2 of the second gear speed (=γ1/γ2) is "1.754", and the ratio of the transmission gear ratio γ2 of the second gear speed to the transmission gear ratio γ3 of the third gear speed (=γ2/γ3) is "1.325". The ratio of the transmission gear ratio γ3 of the third gear speed to the transmission gear ratio γ4 of the fourth gear speed (=γ3/γ4) is "1.325". The ratio of the transmission gear ratio γ4 of the fourth gear speed to the transmission gear ratio γ5 of the fifth gear speed (=γ4/γ5) is "1.323". The ratio of the transmission gear ratio γ5 of the fifth gear speed to the transmission gear ratio γ6 of the sixth gear speed (=γ5/γ6) is "1.323". The ratio of the transmission gear ratio γ6 of the sixth gear speed to the transmission gear ratio γ7 of the seventh gear speed (=γ6/γ7) is "1.323". Thus, the gear ratios γ change substantially in a geometric progression. Furthermore, in the transmission 10, the ratio of the gear ratio γ1 of the first gear speed to the gear ratio γ7 of the seventh gear speed, that is, the gear ratio width (=γ1/γ7), is a relatively great value, that is, "7.132".

FIG. 3 is an alignment graph in which the relative relationships of rotational speeds of rotatable members that vary in state of connection depending on the gear speeds can be indicated by straight lines. The monographic chart of FIG. 3 is a two-dimensional coordinate system in which the relationship among the gear ratios p of the planetary gear units 18, 20, 22 is indicated in the direction of a horizontal axis, and the relative rotational speed is indicated in the direction of a vertical axis. Of the two horizontal lines, a lower horizontal line X1 indicates zero in rotational speed, and the upper horizontal line X2 indicates "1.0" in rotational speed, which is equivalent to the rotational speed of the input shaft 16. The five vertical lines Y1 to Y5 indicate, sequentially from the left, the first sun gear S1 corresponding to a first rotatable element RE1, the first ring gear R1 and the third ring gear R3 connected to each other, which correspond to a second rotatable element RE2, the first carrier CA1, the second ring gear R2 and the third carrier CA3 connected to one another, which correspond to a third rotatable element RE3, the second carrier CA2 corresponding to a fourth rotatable element RE4, and the second sun gear S2 and the third sun gear S3 connected to each other, which correspond to a fifth rotatable element RE5. The intervals between the lines are determined in accordance with the gear ratios ρ1, ρ2, ρ3 of the planetary gear units 18, 20, 22. In a typical alignment graph, the interval between a sun gear vertical line and a carrier vertical line is set corresponding to "1", and the interval between a carrier vertical line and a ring gear vertical line is set corresponding to p. In FIG. 3, the interval between the vertical axis line corresponding to the second sun gear S2 of the second planetary gear unit 20 and the vertical axis line corresponding to the second carrier CA2 of the second planetary gear unit 20 is set corresponding to "1", and the other inter-vertical axis line intervals are set with reference to the aforementioned interval corresponding to "1". As for the rotatable elements, some of the first sun gear S1, the first carrier CA1 and the first ring gear R1 of the first planetary gear unit 18, and the second sun gear S2, the second carrier CA2 and the second ring gear R2 of the second planetary gear unit 20, and the third sun gear S3, the third carrier CA3 and the third ring gear R3 of the third planetary gear unit 22 are connected singly or in combination. Thus, the five rotatable elements, that is, the first rotatable element RE1, the second rotatable element RE2, the third rotatable element RE3, the fourth rotatable element RE4 and the fifth rotatable element RE5, are provided in that order from an end (leftward end) to the other end (rightward end) in the alignment graph.

The arrangement of the rotatable elements in the transmission 10 of this embodiment can be described through the use of the alignment graph of FIG. 3 as follows. The first rotatable element RE1 (S1) is selectively connectable to the input shaft (input rotatable member) 16 via the second clutch C2, and is selectively connectable to the transmission case (non-rotatable member) 12 via the first brake B1. The second rotatable element RE2 (R1, R3) is selectively connectable to the transmission case 12 via the second brake B2. The third rotatable element RE3 (CA1, R2, CA3) is selectively connectable to the input shaft 16 via the first clutch C1, and is selectively connectable to the transmission case 12 via the third brake B3. A portion (CA1) of the third rotatable element RE3 connected to the first clutch C1 and the third brake B3 is selectively connectable to other portions (R2, CA3) of the rotatable element RE3 via the third clutch C3. The fourth rotatable element RE4 (CA2) is connected to the output shaft 24 (output rotatable member). The fifth rotatable element RE5 (S2, S3) is selectively connectable to the transmission case 12 via the fourth brake B4.

When the first gear speed is selected, the rotatable element RE1 is directly connected to the input shaft 16 due to engagement of the second clutch C2, and therefore achieves a rotational speed of "1". Furthermore, the third rotatable element RE3 (the first carrier CA1) achieves a rotational speed of "0" due to engagement of (the third brake B3 and) the one-way clutch F1, and the fifth rotatable element RE5 achieves a rotational speed of "0" due to engagement of the fourth brake B4. Therefore, in the alignment graph of FIG. 3, the rotational speed of the output shaft 24 (the second carrier CA2) in the first gear speed is indicated by a point (1st) of intersection of the vertical line Y4 and a straight line L2 that connects a point of intersection of the vertical line Y5 and the horizontal line X1 and a point Z1 of intersection of the vertical line Y2 corresponding to the second rotatable element RE2 (the first ring gear R1 and the third ring gear R3) and a straight line L1 that extends through a point of intersection of the vertical line Y3 and the horizontal line X1 and a point of intersection of the vertical line Y1 and the horizontal line X2.

When the second gear speed is selected, the first rotatable element RE1 is directly connected to the input shaft 16 due to engagement of the second clutch C2, and therefore achieves the rotational speed of "1". Furthermore, the fifth rotatable element RE5 achieves the rotational speed of "0" due to engagement of the fourth brake B4. The rotational speed of the second carrier CA2 and the output shaft 24 directly connected to the second carrier CA2 that is a step higher compared with the first gear speed is indicated by an intersection point (2nd) of the vertical line Y4 and a straight line L3 that connects between the intersection point of the vertical line Y1 and the horizontal line X2 and the intersection point of the vertical line Y5 and the horizontal line X1.

When the third gear speed is selected, the first rotatable element RE1 is directly connected to the input shaft 16 due to engagement of the second clutch C2, and the first carrier CA1 of the third rotatable element RE3 is directly connected to the input shaft 16 due to engagement of the first clutch C1, so that the ring gears R1, R3 of the second rotatable element RE2 achieve the rotational speed of "1". The fifth rotatable element RE5 achieves the rotational speed of "0" due to engagement of the fourth brake B4. Hence, the rotational speed of the second carrier CA2 and the output shaft 24 directly connected to the second carrier CA2 that is a step higher compared with the second gear speed is indicated by an intersection point (3rd) of the vertical line Y4 and a straight line L4 that connects between an intersection point of the vertical line Y2 and the horizontal line X2 and the intersection point of the vertical line Y5 and the horizontal line X1.

When the fourth gear speed is selected, the first carrier CA1 and the second ring gear R2 as well as the third carrier CA3 of the third rotatable element RE3 are connected each other due to engagement of the third clutch C3, and are directly connected to the input shaft 16 due to engagement of the first clutch C1, and therefore achieve the rotational speed of "1". The fifth rotatable element RE5 achieves the rotational speed of "0" due to engagement of the fourth brake B4. Therefore, the rotational speed of the second carrier CA2 and the output shaft 24 directly connected to the second carrier CA2 that is a step higher compared with the third gear speed is indicated by an intersection point (4th) of the vertical line Y4 and a straight line L5 that connects between an intersection point of the vertical line Y3 and the horizontal line X2 and the intersection point of the vertical line Y5 and the horizontal line X1.

When the fifth gear speed is selected, the clutches C1, C2, C3 are all engaged, so that the planetary gear units 18, 20, 22 are rotated integrally as one unit. Therefore, the rotational speed of the second carrier CA2 and the output shaft 24 directly connected to the second carrier CA2 that is a step higher compared with the fourth gear speed is indicated by an intersection point (5th) of the vertical line Y4 and the horizontal line X2.

When the sixth gear speed is selected, the first rotatable element RE1 achieves the rotational speed of "0" due to engagement of the first brake B1, and the third rotatable element RE3 is connected integrally as a single unit due to engagement of the third clutch C3, and is directly connected to the input shaft 16 due to engagement of the first clutch C1, and therefore achieves the rotational speed of "1". Hence, the rotational speed of the second carrier CA2 and the output shaft 24 directly connected to the second carrier CA2 that is a step higher compared with the fifth gear speed is indicated by an intersection point (6th) of the vertical line Y4 and a straight line L6 that connects between a point on the vertical line Y1 that indicates the rotational speed of "0" and a point on the vertical line Y3 that indicates the rotational speed of "1".

When the seventh gear speed is selected, the second rotatable element RE2 achieves the rotational speed of "0" due to engagement of the second brake B2, and the third rotatable element RE3 is connected integrally as a single unit due to engagement of the third clutch C3, and is directly connected to the input shaft 16 due to engagement of the first clutch C1, and therefore achieves the rotational speed of "1". Hence, the rotational speed of the second carrier CA2 and the output shaft 24 directly connected to the second carrier CA2 that is a step higher compared with the sixth gear speed is indicated by an intersection point (7th) of the vertical line Y4 and a straight line L7 that connects between a point on the vertical line Y2 that indicates the rotational speed of "0" and a point on the vertical line Y3 that indicates the rotational speed of "1".

When the reverse gear speed is selected, the third rotatable element RE3 is integrated as a single unit due to engagement of the third clutch C3, and achieves the rotational speed of "0" due to engagement of the third brake B3. Furthermore, the first rotatable element RE1 (the first sun gear S1) achieves the rotational speed of "1" due to engagement of the second clutch C2. The negative rotational speed of the output shaft 24 is indicated by an intersection point (Rev) of the vertical line Y4 corresponding to the fourth rotatable element RE4 (the second carrier CA2) and the straight line L1 that extends through the intersection point of the vertical line Y1 and the horizontal line X2 and an intersection point of the vertical line Y3 and the horizontal line X1.

As described above, according to the embodiment, since the combination of the first planetary gear unit 18, the second planetary gear unit 20, and the third planetary gear unit 22 achieves as broad a range of gear ratios as seven forward speeds, it is possible to provide a small-size vehicular planetary gear type multi-speed transmission 10 capable of achieving good high-speed running performance and good uphill starting performance. That is, since the gear ratios γ change substantially in a geometric progression and the gear ratio γR of the reverse gear speed is an intermediate value between the first gear speed and the second gear speed, for example, "3.093", a good speed increasing characteristic or a good accelerating characteristic based on gear speed shifts can be attained. Furthermore, since the gear ratio width of the transmission 10 (=γ1/γ7) is set at a relatively great value, for example, 7.132, it is possible to provide a small-size vehicular planetary gear type multi-speed transmission 10 capable of achieving good high-speed running performance and good uphill starting performance.

Furthermore, in the embodiment, the first clutch C1 and the second clutch C2 are congregated in a forward portion of the transmission 10, and the first brake B1, the second brake B2, and the third brake B3 are congregated radially outward in the transmission 10, that is, toward the transmission case 12. Therefore, the layout of hydraulic circuits becomes easy.

Still further, in the embodiment, the first planetary gear unit 18, the second planetary gear unit 20, and the third planetary gear unit 22 are sequentially disposed between the input shaft 16 and the output shaft 24, and the output shaft of the engine is input to the input shaft 16 of the transmission 10 via the torque converter 14. Therefore, it becomes possible to design a compact automatic transmission.

Furthermore, in the embodiment, since the one-way clutch F1 is provided in parallel to the third brake B3 between the first carrier CA1 and the transmission case 12. Therefore, engagement of the third brake B3 makes it possible to establish a first gear speed that allows the engine brake effect. However, engagement of the one-way clutch F1 instead of the third brake B3 makes it possible to establish a first gear speed where the engine brake is ineffective. In other embodiments, too, it is possible to establish an engine brake-effective first gear speed through engagement of a brake and to establish an engine brake-ineffective first gear speed through engagement of the one-way clutch F1 instead of the brake, as indicated in tables of relationships of actuation of hydraulically driven friction engagement devices (FIGS. 5, 8, 11, 14, 17, 20, 23, 26, and 29) where symbols "◉" and "○" are shown at the brake and the one-way clutch, respectively, for the first gear speed.

Furthermore, in the embodiment, the first planetary gear unit 18, the second planetary gear unit 20, and the third planetary gear unit 22 are sequentially disposed from the side of the input shaft 16, and the output shaft 24 extends through a center portion of the third planetary gear unit 22, and connects to the second carrier CA2 of the second planetary gear unit 20. Therefore, the automatic transmission 10 can be suitably employed in a case where a transmission is installed in a longitudinal placement in a vehicle, for example, in an FR vehicle.

Other embodiments of the invention will be described below. In the description below, portions comparable to those of the foregoing embodiment are represented by comparable reference characters in drawings, and will not be described below.

Figure 4:
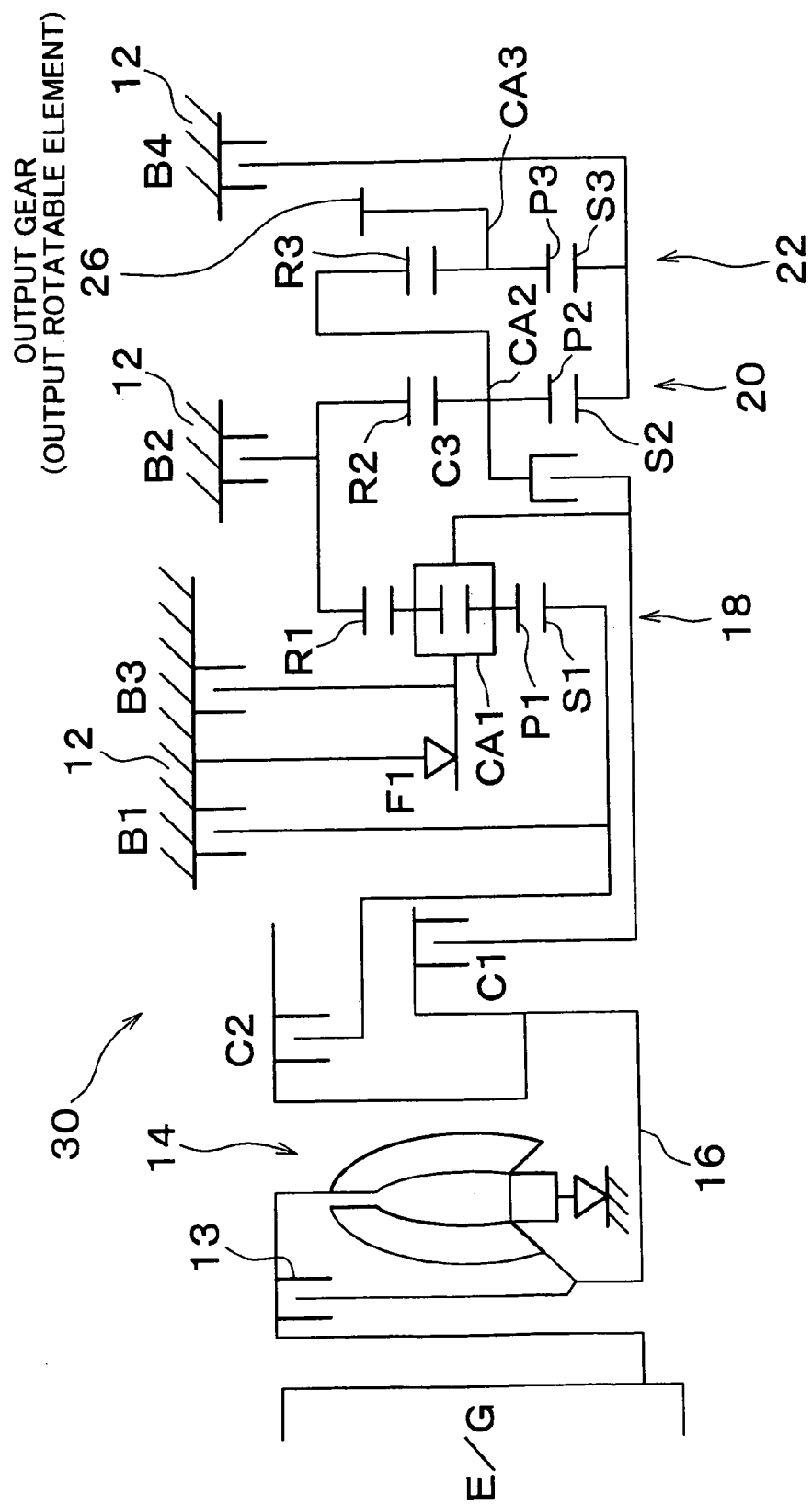
FIG. 4 is a skeleton diagram illustrating a construction of portions of a vehicular planetary gear type multi-speed transmission in accordance with a second embodiment of the invention, corresponding to FIG. 1.
Figure 6:
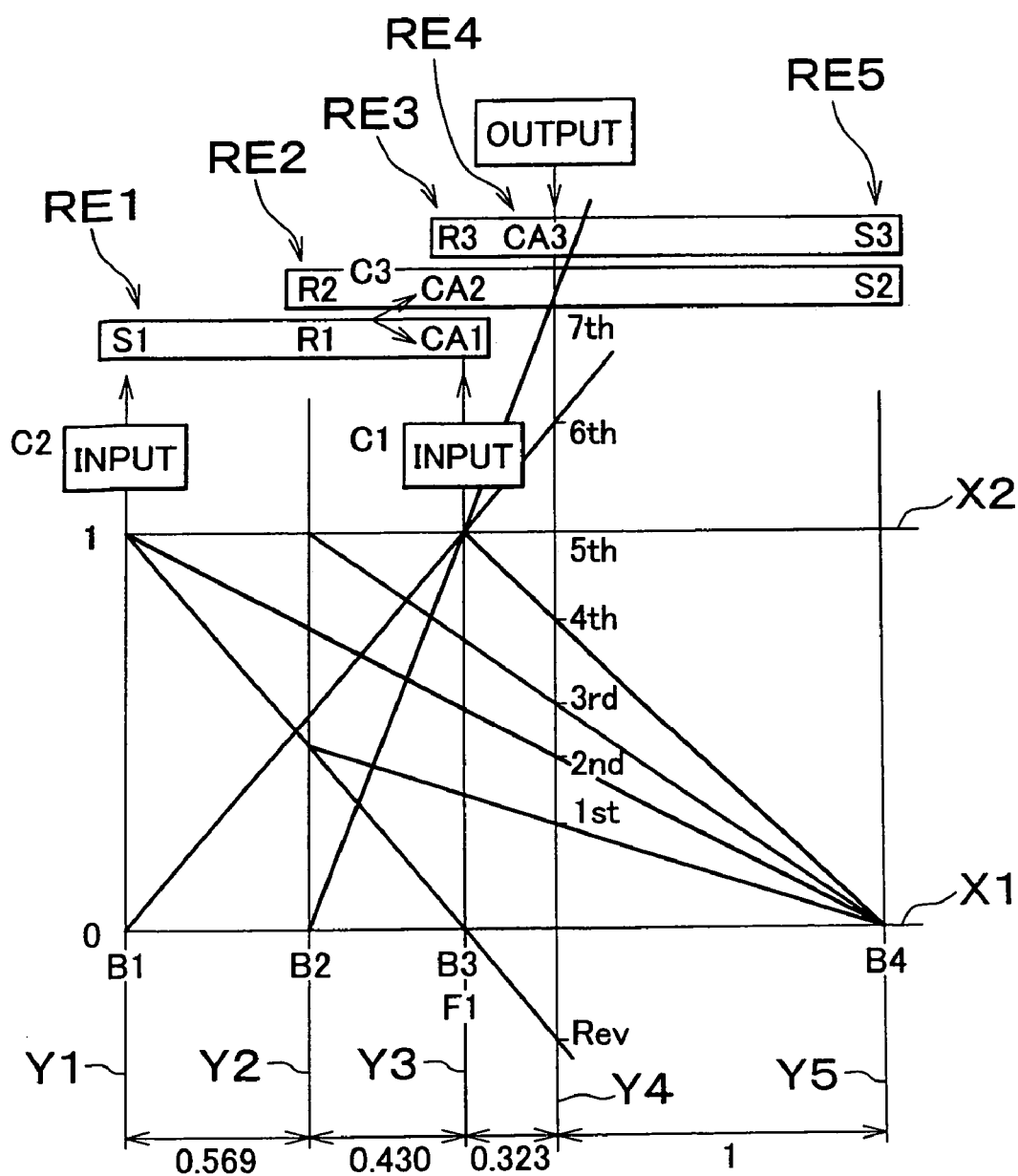
FIG. 6 is an alignment graph illustrating operation of the vehicular planetary gear type multi-speed transmission of the second embodiment, corresponding to FIG. 3.

FIG. 4 is a skeleton diagram illustrating the construction of a transmission 30 in accordance with a second embodiment of the invention. FIG. 5 is a table indicating relationships between the gear speeds of the transmission 30 and actuation of hydraulically driven friction engagement devices that are needed to establish the individual gear speeds. FIG. 6 is an alignment graph indicating the rotational speeds of rotatable elements corresponding to the transmission gear speeds.

The second embodiment differs from the first embodiment in the following respects. In the second embodiment, the transmission 30 is designed for suitable use as an FF vehicle automatic transmission that is installed transversely in a vehicle. That is, an output gear 26 that serves as an output rotatable member is disposed between a third planetary gear unit 22 and a fourth brake B4, and is connected to a third carrier CA3 of the third planetary gear unit 22. Furthermore, a first ring gear R1 is connected to a second ring gear R2, and a first carrier CA1 is connected to a second carrier CA2 and a third ring gear R3 via a third clutch C3.

Other portions and structures and engagement actions are substantially the same as those of the first embodiment. The second embodiment achieves substantially the same advantages as the first embodiment. The output gear 26 is meshed with, for example, a large-diameter gear of a differential gear unit.

FIG. 6 is an alignment graph of the transmission 30 of this embodiment. In this embodiment, the first rotatable element RE1 is formed by the first sun gear S1, and the second rotatable element RE2 is formed by the first ring gear R1 and the second ring gear R2. The third rotatable element RE3 is formed by the first carrier CA1, the second carrier CA2, and the third ring gear R3. The fourth rotatable element RE4 is formed by the third carrier CA3. The fifth rotatable element RE5 is formed by the second sun gear S2 and the third sun gear S3. The third clutch C3 is provided between the first carrier CA1 and the second carrier CA2 as well as the third ring gear R3. Through the use of this alignment graph, the construction of the transmission 30 of this embodiment can be described as follows. The first rotatable element RE1 (S1) is selectively connectable to the input shaft (input rotatable member) 16 via the second clutch C2, and is selectively connectable to the transmission case (non-rotatable member) 12 via the first brake B1. The second rotatable element RE2 (R1, R2) is selectively connectable to the transmission case 12 via the second brake B2. The third rotatable element RE3 (CA1, CA2, R3) is selectively connectable to the input shaft 16 via the first clutch C1, and is selectively connectable to the transmission case 12 via the third brake B3. A portion (CA1) of the third rotatable element RE3 connected to the first clutch C1 and the third brake B3 is selectively connectable to other portions (CA2, R3) of the rotatable element RE3 via the third clutch C3. The fourth rotatable element RE4 (CA3) is connected to the output gear 26 (output rotatable member). The fifth rotatable element RE5 (S2, S3) is selectively connectable to the transmission case 12 via the fourth brake B4.

Figure 7:
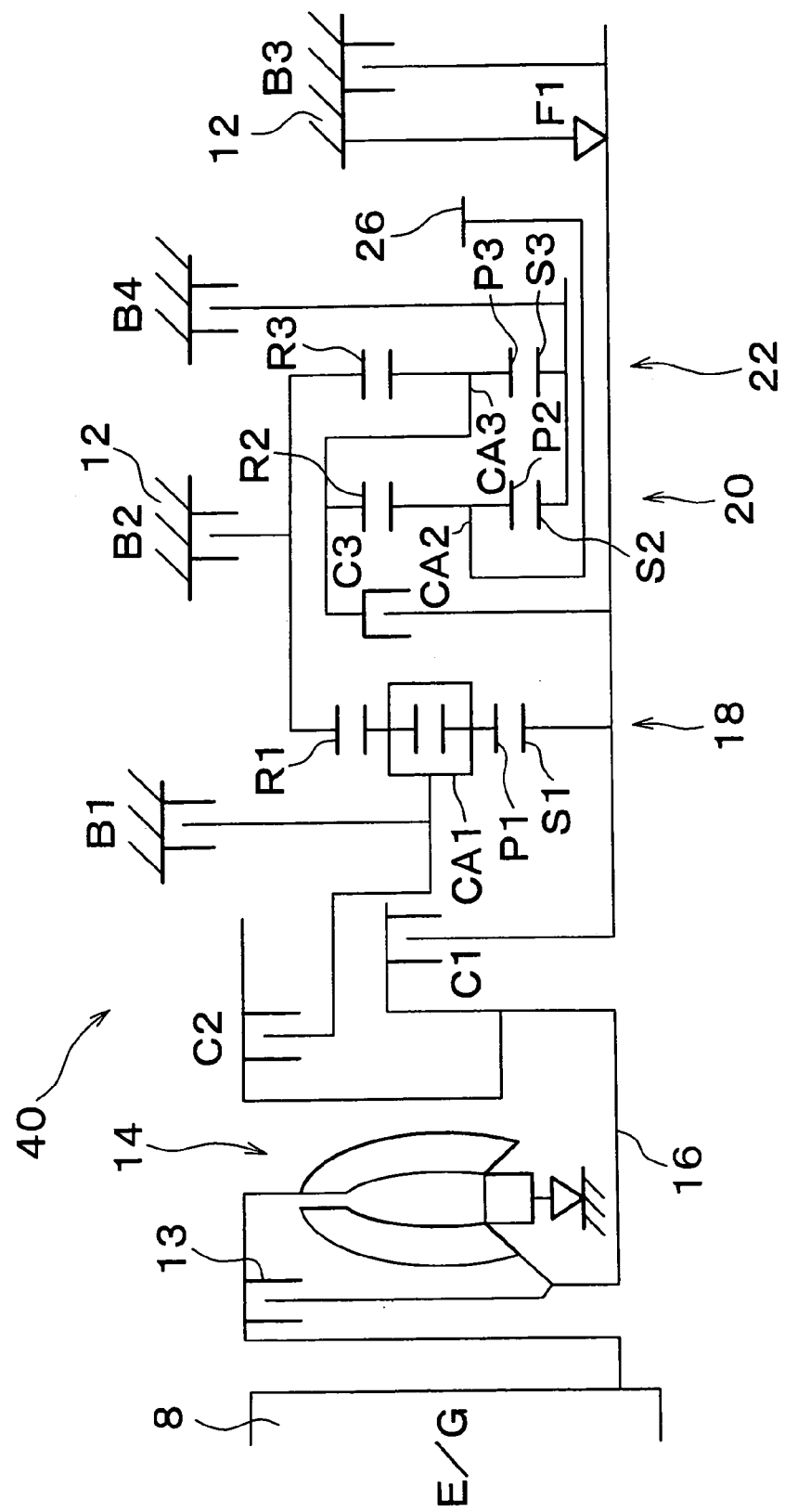
FIG. 7 is a skeleton diagram illustrating a construction of portions of a vehicular planetary gear type multi-speed transmission in accordance with a third embodiment of the invention, corresponding to FIG. 1.
Figure 9:
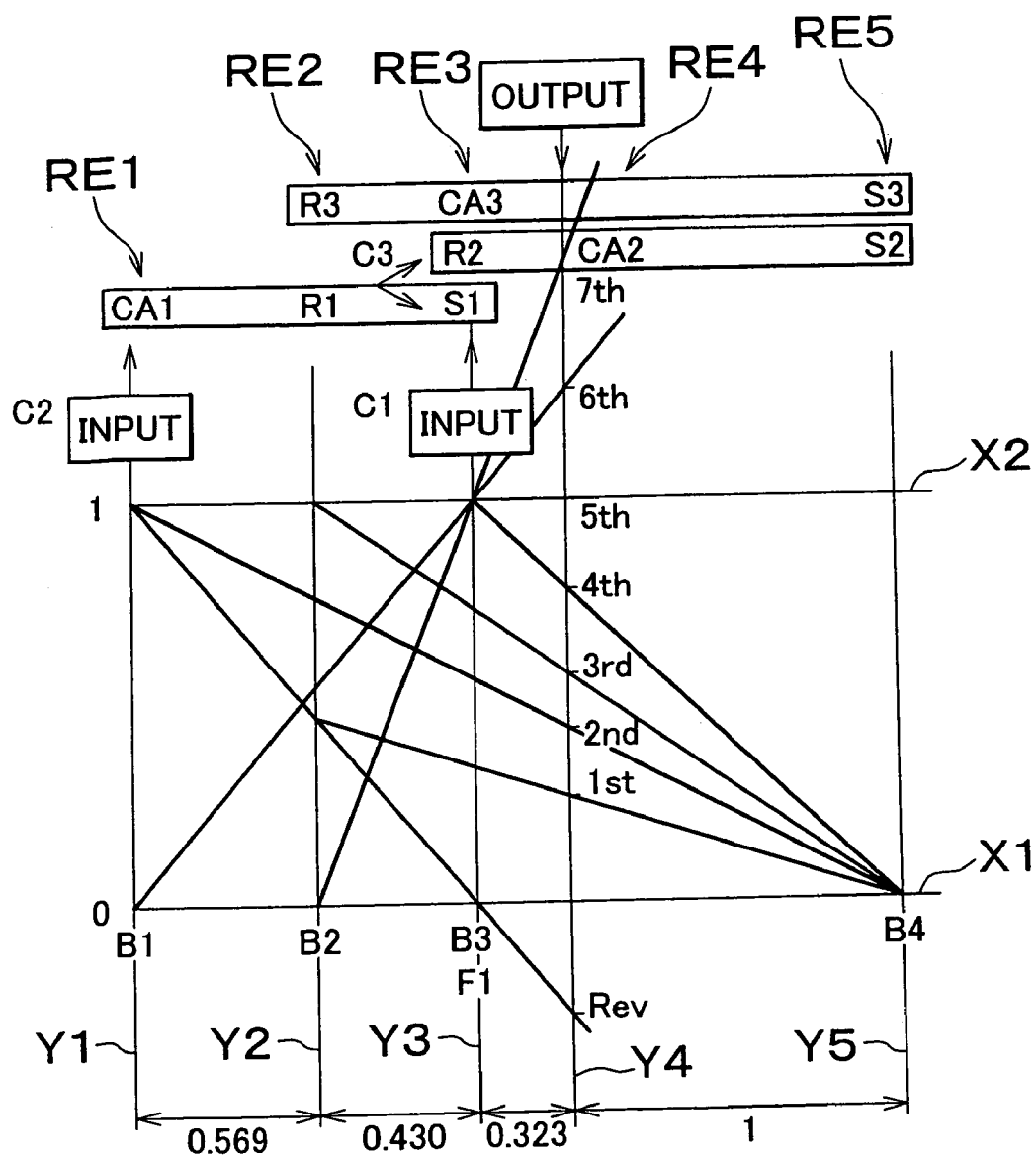
FIG. 9 is an alignment graph illustrating operation of the vehicular planetary gear type multi-speed transmission of the third embodiment, corresponding to FIG. 3.

FIG. 7 is a skeleton diagram illustrating the construction of a transmission 40 in accordance with a third embodiment of the invention. FIG. 8 is a table indicating relationships between the gear speeds of the transmission 40 and actuation of hydraulically driven friction engagement devices that are needed to establish the individual gear speeds. FIG. 9 is an alignment graph indicating the rotational speeds of rotatable elements corresponding to the transmission gear speeds.

The third embodiment differs from the first embodiment in the following respects. In the third embodiment, the rotatable elements of the first planetary gear unit 18 that receive input torque from the first clutch C1 and the second clutch C2 are reversed, compared with the connections of the first and second clutches C1, C2 to the elements. A third clutch C3 connects between a first sun gear S1 and a second ring gear R2 as well as a third carrier CA3. A third brake B3 is disposed in an output-side end portion of the transmission 40. Furthermore, for suitable use as an FF vehicle automatic transmission, an output gear 26 is disposed between the third brake B3 and a fourth brake B4 that is disposed at an output side of a third planetary gear unit 22.

In other respects, this embodiment is substantially the same as the first embodiment. That is, in the transmission 40, the second ring gear R2 and the third carrier CA3 are connected. The first ring gear R1 and the third ring gear R3 are connected. The second sun gear S2 and the third sun gear S3 are connected. The input shaft 16 is selectively connectable to the first sun gear S1 via the first clutch C1. The input shaft 16 is selectively connectable to the first carrier CA1 via the second clutch C2. Since the third clutch C3 is disposed between the first sun gear S1 and the second ring gear R2 as well as the third carrier CA3, the first sun gear S1 is selectively connectable to the second ring gear R2 and the third carrier CA3 via the third clutch C3. The first brake B1 is disposed between the first carrier CA1 and the transmission case 12. The second brake B2 is disposed between the transmission case 12 and the first ring gear R1 as well as the third ring gear R3. The third brake B3 and the one-way clutch F1 are disposed in parallel between the first sun gear S1 and the transmission case 12. The fourth brake B4 is disposed between the transmission case 12 and the second sun gear S2 as well as the third sun gear S3. The output gear 26, disposed between the third brake B3 and the fourth brake B4 disposed at the output side of the third planetary gear unit 22, is connected to the second carrier CA2.

In the transmission 40 constructed as described above, one of the first to seven gear speeds or a reverse gear speed is selectively achieved by simultaneously engaging two or three engagement devices selected from the first clutch C1, the second clutch C2, the third clutch C3, the first brake B1, the second brake B2, the third brake B3, and the fourth brake B4, for example, as indicated in an engagement table of FIG. 8 similar to FIG. 2. As in the first embodiment, the transmission 40 is designed so that the transmission gear ratio γ (=input shaft rotational speed Nin/output shaft rotational speed Nout) is shifted substantially in a geometric progression in a sequence of the gear speeds.

Specifically, referring to FIG. 8, if the second clutch C2, the third brake B3 and the fourth brake B4 are engaged, so that connection is established between the input shaft 16 and the first carrier CA1, and between the first sun gear S1 and the transmission case 12, and between the transmission case 12 and the second sun gear S2 as well as the third sun gear S3, respectively, then the first gear speed of a gear ratio γ1 is achieved. The transmission gear ratio γ1 has a maximum ratio value, for example, "4.073".

If the second clutch C2, the third clutch C3 and the fourth brake B4 are engaged, so that connection is established between the input shaft 16 and the first carrier CA1, and between the first sun gear S1 and the second ring gear R2 as well as the third carrier CA3, and between the transmission case 12 and the second sun gear S2 as well as the third sun gear S3, respectively, then the second gear speed of a transmission gear ratio γ2 that is smaller than the gear ratio γ1 of the first gear speed is established. The gear ratio γ2 of the second speed is, for example, about "2.322".

If the first clutch C1, the second clutch C2 and the fourth brake B4 are engaged, so that connection is established between the input shaft 16 and the first sun gear S1, and between the input shaft 16 and the first carrier CA1, and between the transmission case 12 and the second sun gear S2 as well as the third sun gear S3, respectively, the third gear speed of a gear ratio γ3 that is smaller than the gear ratio γ2 of the second gear speed is established. The gear ratio γ3 of the third speed is, for example, about "1.753".

If the first clutch C1, the third clutch C3 and the fourth brake B4 are engaged, so that connection is established between the input shaft 16 and the first sun gear S1, and between the first sun gear S1 and the second ring gear R2 as well as the third carrier CA3, and between the transmission case 12 and the second sun gear S2 as well as the third sun gear S3, respectively, the fourth gear speed of a gear ratio γ4 that is smaller than the gear ratio γ3 of the third gear speed is established. The gear ratio γ4 of the fourth speed is, for example, about "1.323".

If the first clutch C1, the second clutch C2 and the third clutch C3 are engaged, so that connection is established between the input shaft 16 and the first sun gear S1, and between the input shaft 16 and the first carrier CA1, and between the first sun gear S1 and the second ring gear R2 as well as the third carrier CA3, respectively, the fifth gear speed of a gear ratio γ5 that is smaller than the gear ratio γ4 of the fourth gear speed is established. The gear ratio γ5 of the fifth speed is, for example, about "1.000".

If the first clutch C1, the third clutch C3 and the first brake B1 are engaged, so that connection is established between the input shaft 16 and the first sun gear S1, and between the first sun gear S1 and the second ring gear R2 as well as the third carrier CA3, and between the first carrier CA1 and the transmission case 12, respectively, the sixth gear speed of a gear ratio γ6 that is smaller than the gear ratio γ5 of the fifth gear speed is established. The gear ratio γ6 of the sixth speed is, for example, about "0.756".

If the first clutch C1, the third clutch C3 and the second brake B2 are engaged, so that connection is established between the input shaft 16 and the first sun gear S1, and between the first sun gear S1 and the second ring gear R2 as well as the third carrier CA3, and between the transmission case 12 and the first ring gear R1 as well as the third ring gear R3, respectively, the seventh gear speed of a gear ratio γ7 that is smaller than the gear ratio γ6 of the sixth gear speed is established. The gear ratio γ7 of the seventh speed is, for example, about "0.571".

If the second clutch C2, the third clutch C3 and the third brake B3 are engaged, so that connection is established between the input shaft 16 and the first carrier CA1, and between the first sun gear S1 and the second ring gear R2 as well as the third carrier CA3, and between the first sun gear S1 and the transmission case 12, respectively, the reverse gear speed of a gear ratio γR that is between the gear ratio γ1 of the first speed and the gear ratio γ2 of the second speed is established. The gear ratio γR of the reverse speed is, for example, about "3.093".

The gear ratio ρ1 (=0.5696) of the first planetary gear unit 18, the gear ratio ρ2 (=0.323) of the second planetary gear unit 20, and the gear ratio ρ3 (=0.325) of the third planetary gear unit 22 are set so that the aforementioned transmission gear ratios are achieved.

In the transmission 40, the ratio of the transmission gear ratio γ1 of the first gear speed to the transmission gear ratio γ2 of the second gear speed (=γ1/γ2) is "1.754", and the ratio of the transmission gear ratio γ2 of the second gear speed to the transmission gear ratio γ3 of the third gear speed (=γ2/γ3) is "1.325". The ratio of the transmission gear ratio γ3 of the third gear speed to the transmission gear ratio γ4 of the fourth gear speed (=γ3/γ4) is "1.325". The ratio of the transmission gear ratio γ4 of the fourth gear speed to the transmission gear ratio γ5 of the fifth gear speed (=γ4/γ5) is "1.323". The ratio of the transmission gear ratio γ5 of the fifth gear speed to the transmission gear ratio γ6 of the sixth gear speed (=γ5/γ6) is "1.323". The ratio of the transmission gear ratio γ6 of the sixth gear speed to the transmission gear ratio γ7 of the seventh gear speed (=γ6/γ7) is "1.323". Thus, the gear ratios γ change substantially in a geometric progression. Furthermore, in the transmission 40, the ratio of the gear ratio γ1 of the first gear speed to the gear ratio γ7 of the seventh gear speed, that is, the gear ratio width (=γ1/γ7), is a relatively great value, that is, "7.132".

FIG. 9 is an alignment graph of the transmission 40 in this embodiment. In this embodiment, the first rotatable element RE1 is formed by the first carrier CA1, and the second rotatable element RE2 is formed by the first ring gear R1 and the third ring gear R3. The third rotatable element RE3 is formed by the first sun gear S1, the second ring gear R2, and the third carrier CA3. The fourth rotatable element RE4 is formed by the second carrier CA2. The fifth rotatable element RE5 is formed by the second sun gear S2 and the third sun gear S3. The third clutch C3 is provided between the first sun gear S1 and the second ring gear R2 as well as the third carrier CA3. Through the use of this alignment graph, the construction of the transmission 40 of this embodiment can be described as follows. The first rotatable element RE1 (CA1) is selectively connectable to the input shaft (input rotatable member) 16 via the second clutch C2, and is selectively connectable to the transmission case (non-rotatable member) 12 via the first brake B1. The second rotatable element RE2 (R1, R3) is selectively connectable to the transmission case 12 via the second brake B2. The third rotatable element RE3 (S1, R2, CA3) is selectively connectable to the input shaft 16 via the first clutch C1, and is selectively connectable to the transmission case 12 via the third brake B3. A portion (S1) of the third rotatable element RE3 connected to the first clutch C1 and the third brake B3 is selectively connectable to other portions (R2, CA3) of the rotatable element RE3 via the third clutch C3. The fourth rotatable element RE4 (CA2) is connected to the output gear 26 (output rotatable member). The fifth rotatable element RE5 (S2, S3) is selectively connectable to the transmission case 12 via the fourth brake B4.

As described above, according to the transmission 40 of the embodiment, since the combination of the three planetary gear units, that is, the first planetary gear unit 18, the second planetary gear unit 20, and the third planetary gear unit 22, achieves as broad a range of transmission gear ratios as seven forward speeds, it is possible to provide a small-size vehicular planetary gear type multi-speed transmission 40 capable of achieving good high-speed running performance and good uphill starting performance. That is, since the gear ratios γ change substantially in a geometric progression and the gear ratio γR of the reverse gear speed is an intermediate value between the first gear speed and the second gear speed, for example, "3.093", good speed increasing characteristics or good accelerating characteristics based on gear speed shifts can be attained. Furthermore, since the gear ratio width of the transmission 40 (=γ1/γ7) is set at a relatively great value, for example, 7.132, it is possible to provide a small-size vehicular planetary gear type multi-speed transmission 40 capable of achieving good high-speed running performance and good uphill starting performance. This embodiment further achieves substantially the same advantages as the foregoing embodiments.

Figure 10:
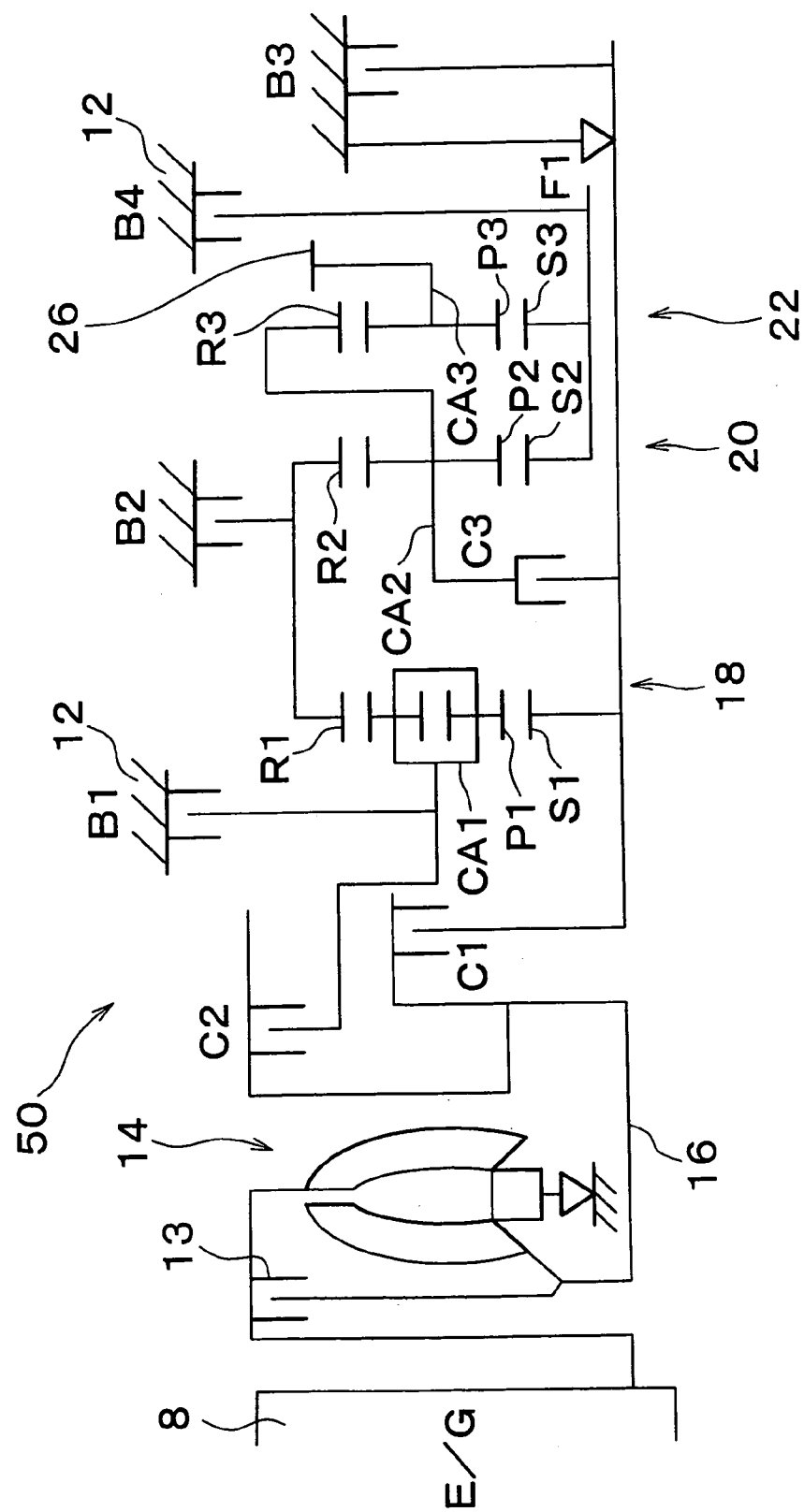
FIG. 10 is a skeleton diagram illustrating a construction of portions of a vehicular planetary gear type multi-speed transmission in accordance with a fourth embodiment of the invention, corresponding to FIG. 1.

FIG. 10 is a skeleton diagram illustrating the construction of a transmission 50 in accordance with a fourth embodiment of the invention. FIG. 11 is a table indicating relationships between the gear speeds of the transmission 50 and actuation of hydraulically driven friction engagement devices that are needed to establish the individual gear speeds.

The fourth embodiment differs from the third embodiment in the following respects. In the fourth embodiment, an output gear 26 that serves as an output rotatable member is disposed between a third planetary gear unit 22 and a fourth brake B4, and is connected to a third carrier CA3 of the third planetary gear unit 22. A first ring gear R1 is connected to a second ring gear R2. A first sun gear S1 is connectable to a second carrier CA2 and a third ring gear R3 via a third clutch C3.

Other portions and structures, and engagement actions are substantially the same as those of the third embodiment. The fourth embodiment achieves substantially the same advantages as the third embodiment.

Figure 12:
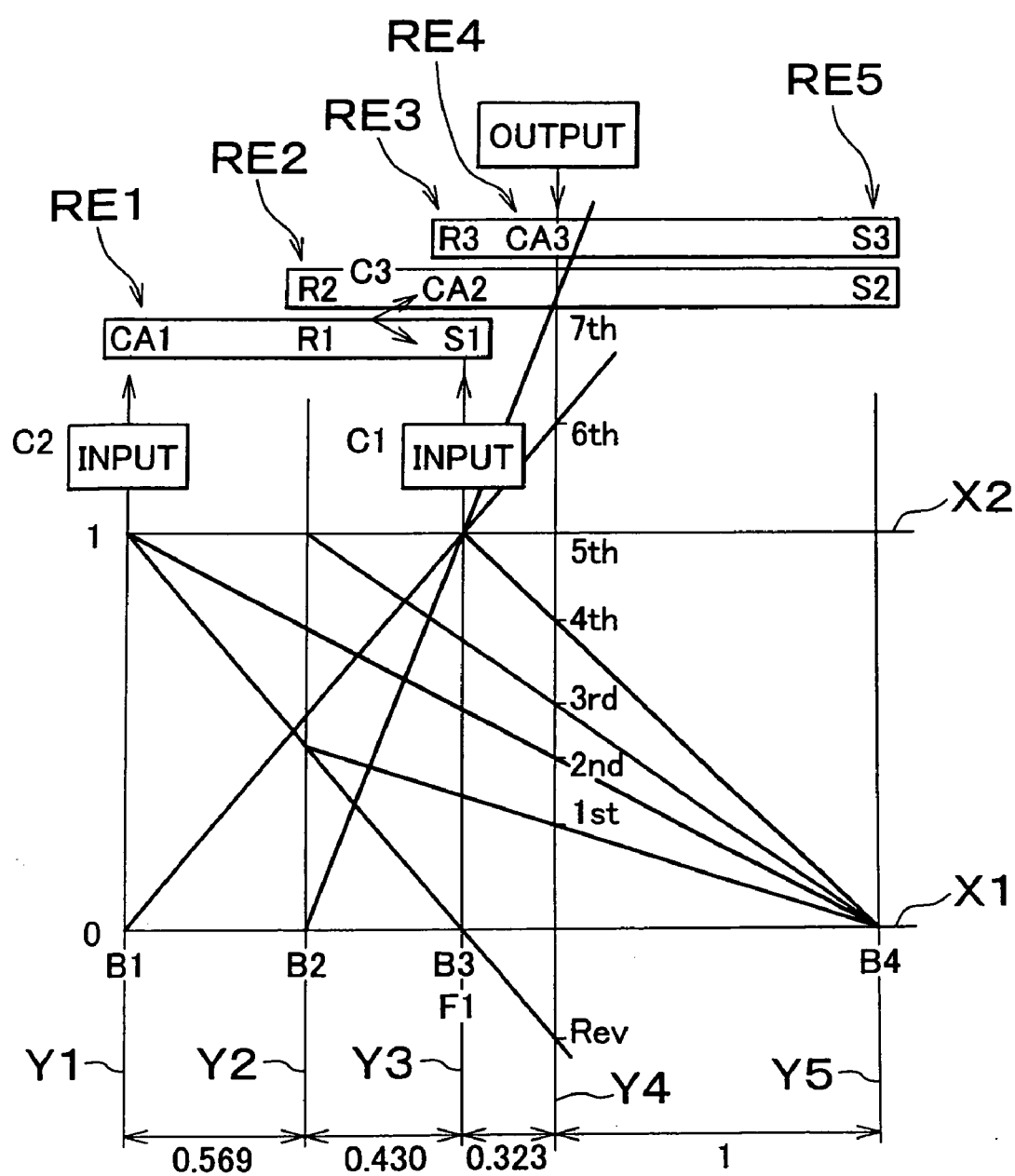
FIG. 12 is an alignment graph illustrating operation of the vehicular planetary gear type multi-speed transmission of the fourth embodiment, corresponding to FIG. 3.

FIG. 12 is an alignment graph of the transmission 50 in this embodiment. In this embodiment, the first rotatable element RE1 is formed by the first carrier CA1, and the second rotatable element RE2 is formed by the first ring gear R1 and the second ring gear R2. The third rotatable element RE3 is formed by the first sun gear S1, the second carrier CA2, and the third ring gear R3. The fourth rotatable element RE4 is formed by the third carrier CA3. The fifth rotatable element RE5 is formed by the second sun gear S2 and the third sun gear S3. The third clutch C3 is provided between the first sun gear S1 and the second carrier CA2 as well as the third ring gear R3.

Through the use of this alignment graph, the construction of the transmission 50 of this embodiment can be described as follows. The first rotatable element RE1 (CA1) is selectively connectable to the input shaft (input rotatable member) 16 via the second clutch C2, and is selectively connectable to the transmission case (non-rotatable member) 12 via the first brake B1. The second rotatable element RE2 (R1, R2) is selectively connectable to the transmission case 12 via the second brake B2. The third rotatable element RE3 (S1, CA2, R3) is selectively connectable to the input shaft 16 via the first clutch C1, and is selectively connectable to the transmission case 12 via the third brake B3. A portion (S1) of the third rotatable element RE3 connected to the first clutch C1 and the third brake B3 is selectively connectable to other portions (CA2, R3) of the rotatable element RE3 via the third clutch C3. The fourth rotatable element RE4 (CA3) is connected to the output gear 26 (output rotatable member). The fifth rotatable element RE5 (S2, S3) is selectively connectable to the transmission case 12 via the fourth brake B4.

Figure 13:
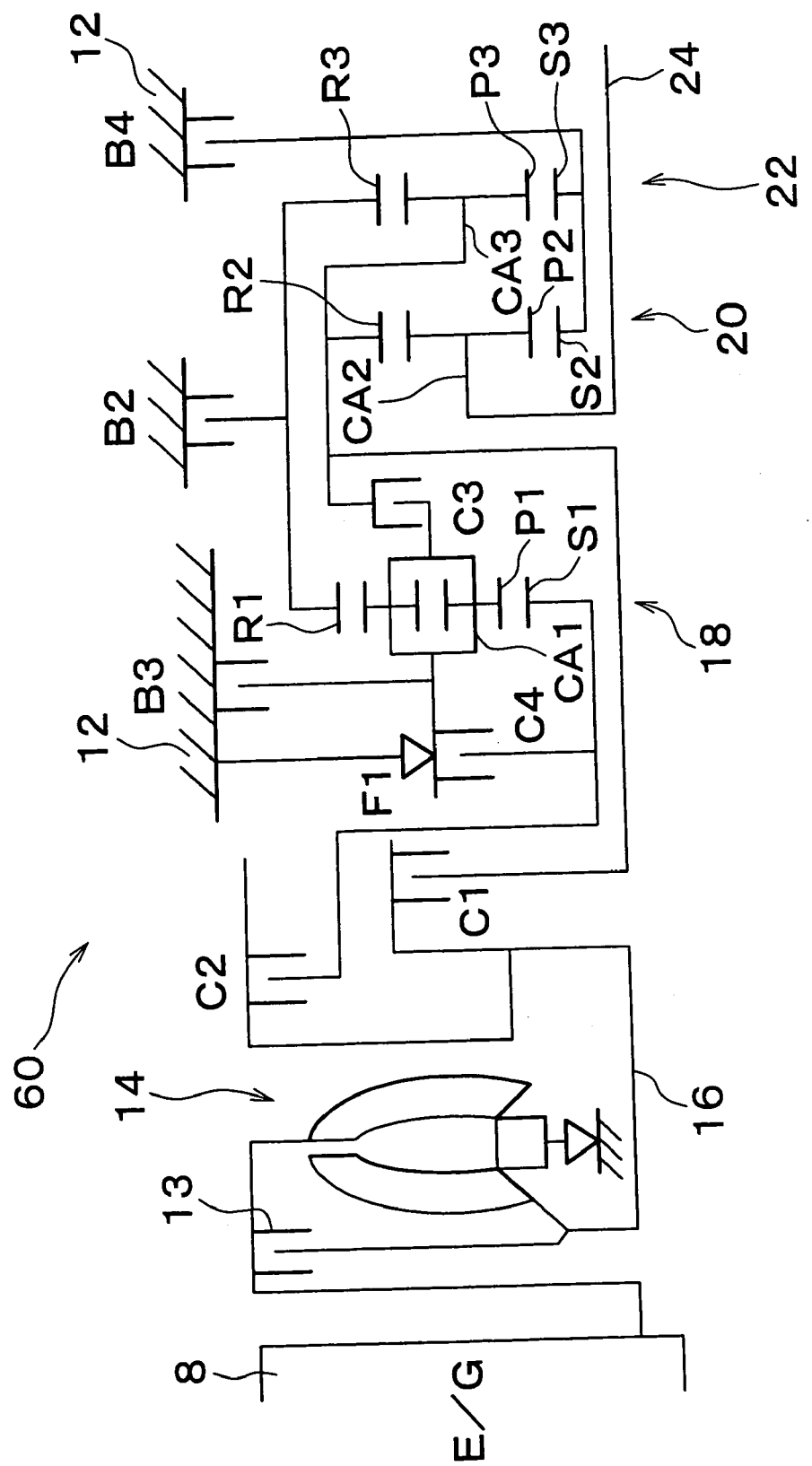
FIG. 13 is a skeleton diagram illustrating a construction of portions of a vehicular planetary gear type multi-speed transmission in accordance with a fifth embodiment of the invention, corresponding to FIG. 1.

FIG. 13 is a skeleton diagram illustrating the construction of a transmission 60 in accordance with a fifth embodiment of the invention. FIG. 14 is a table indicating relationships between the gear speeds of the transmission 60 and actuation of hydraulically driven friction engagement devices that are needed to establish the individual gear speeds. This embodiment differs from the first embodiment in that a fourth clutch C4 is provided between the first sun gear S1 and the first carrier CA1, and that the input shaft 16 is directly connected to the second ring gear R2 and the third carrier CA3 via the first clutch C1, and also differs in combinations of actuation of friction engagement devices for achieving the third to seventh gear speeds. In other respects, the embodiment is substantially the same as the first embodiment.

That is, in the transmission 60, the first ring gear R1 and the third ring gear R3 are firmly connected to each other. The second ring gear R2 and the third carrier CA3 are firmly connected, and the second sun gear S2 and the third sun gear S3 are firmly connected. The input shaft (input rotatable member) 16 is selectively connectable to the second ring gear R2 and the third carrier CA3 via the first clutch C1. The input shaft 16 is selectively connectable to the first sun gear S1 via the second clutch C2. The third clutch C3 is disposed between the first carrier CA1 and the second ring gear R2 as well as the third carrier CA3 so that the first carrier CA1 is selectively connectable to the second ring gear R2 and the third carrier CA3 via the third clutch C3. The first sun gear S1 is selectively connectable to the first carrier CA1 via the fourth clutch C4. The second brake B2 is provided between the transmission case 12 and the first ring gear R1 as well as the third ring gear R3. The third brake B3 and the one-way clutch F1 are disposed in parallel between the transmission case 12 and the first carrier CA1. The fourth brake B4 is provided between the transmission case 12 and the second sun gear S2 as well as the third sun gear S3.

In the transmission 60 constructed as described above, one of the first to seven gear speeds or a reverse gear speed is selectively achieved by simultaneously engaging two or three engagement devices selected from the first clutch C1, the second clutch C2, the third clutch C3, the fourth clutch C4, the first brake B1, the second brake B2, the third brake B3, and the fourth brake B4, for example, as indicated in an engagement table of FIG. 14. The transmission 60 is designed so that the transmission gear ratio γ (=input shaft rotational speed Nin/output shaft rotational speed Nout) is shifted substantially in a geometric progression in a sequence of the gear speeds.

Specifically, referring to FIG. 14, if the second clutch C2, the third brake B3 and the fourth brake B4 are engaged, so that connection is established between the input shaft 16 and the first sun gear S1, and between the first carrier CA1 and the transmission case 12, and between the transmission case 12 and the second sun gear S2 as well as the third sun gear S3, respectively, then the first gear speed of a gear ratio $\gamma 1$ is achieved. The transmission gear ratio $\gamma 1$ has a maximum ratio value, for example, "4.285".

If the second clutch C2, the third clutch C3 and the fourth brake B4 are engaged, so that connection is established between the input shaft 16 and the first sun gear S1, and between the first carrier CA1 and the second ring gear R2 as well as the third carrier CA3, and between the transmission case 12 and the second sun gear S2 as well as the third sun gear S3, respectively, then the second gear speed of a transmission gear ratio $\gamma 2$ that is smaller than the gear ratio $\gamma 1$ of the first gear speed is established. The gear ratio $\gamma 2$ of the second speed is, for example, about "2.473".

If the second clutch C2, the fourth clutch C4 and the fourth brake B4 are engaged to establish connections between the input shaft 16 and the first sun gear S1, and between the first sun gear S1 and the first carrier CA1, and between the transmission case 12 and the second sun gear S2 as well as the third sun gear S3, respectively, the third gear speed of a gear ratio $\gamma 3$ that is smaller than the gear ratio $\gamma 2$ of the second gear speed is established. The gear ratio $\gamma 3$ of the third speed is, for example, about "1.790".

If the first clutch C1 and the fourth brake B4 are engaged to establish connections between the input shaft 16 and the second ring gear R2 as well as the third carrier CA3, and between the transmission case 12 and the second sun gear S2 as well as the third sun gear S3, respectively, the fourth gear speed of a gear ratio $\gamma 4$ that is smaller than the gear ratio $\gamma 3$ of the third gear speed is established. The gear ratio $\gamma 4$ of the fourth speed is, for example, about "1.300". At the fourth gear speed, the fourth clutch C4 is engaged, but the engagement of the fourth clutch C4 is not relevant to power transfer. In tables indicating relationships between gear speeds and actuation of hydraulically-driven friction engagement devices in this and other embodiments (FIGS. 14, 17, 20 and 23), the engagement indicated by symbol "$\rho$" is irrelevant to power transfer.

If the first clutch C1, the second clutch C2 and the fourth clutch C4 are engaged to establish connections between the input shaft 16 and the second ring gear R2 as well as the third carrier CA3, and between the input shaft 16 and the first sun gear S1, and between the first sun gear S1 and the first carrier CA1, respectively, the fifth gear speed of a gear ratio $\gamma 5$ that is smaller than the gear ratio $\gamma 4$ of the fourth gear speed is established. The gear ratio $\gamma 5$ of the fifth speed is, for example, about "1.000".

If the first clutch C1, the second clutch C2 and the third brake B3 are engaged to establish connections between the input shaft 16 and the second ring gear R2 as well as the third carrier CA3, and between the input shaft 16 and the first sun gear S1, and between the first carrier CA1 and the transmission case 12, respectively, the sixth gear speed of a gear ratio $\gamma 6$ that is smaller than the gear ratio $\gamma 5$ of the fifth gear speed is established. The gear ratio $\gamma 6$ of the sixth speed is, for example, about "0.737".

If the first clutch C1 and the second brake B2 are engaged to establish connections between the input shaft 16 and the second ring gear R2 as well as the third carrier CA3, and between the transmission case 12 and the first ring gear R1 as well as the third ring gear R3, respectively, the seventh gear speed of a gear ratio $\gamma 7$ that is smaller than the gear ratio $\gamma 6$ of the sixth gear speed is established. The gear ratio $\gamma 7$ of the seventh speed is, for example, about "0.620".

If the second clutch C2, the third clutch C3 and the third brake B3 are engaged to establish connections between the input shaft 16 and the first sun gear S1, and between the first carrier CA1 and the second ring gear R2 as well as the third carrier CA3, and between the first carrier CA1 and the transmission case 12, respectively, the reverse gear speed of a gear ratio $\gamma R$ that is between the gear ratio $\gamma 1$ of the first speed and the gear ratio $\gamma 2$ of the second speed is established. The gear ratio $\gamma R$ of the reverse speed is, for example, about "3.910".

The gear ratio $\rho 1$ (=0.4177) of the first planetary gear unit 18, the gear ratio $\rho 2$ (=0.300) of the second planetary gear unit 20, and the gear ratio $\rho 3$ (=0.377) of the third planetary gear unit 22 are set so that the aforementioned transmission gear ratios are achieved.

In the transmission 60, the ratio of the transmission gear ratio $\gamma 1$ of the first gear speed to the transmission gear ratio $\gamma 2$ of the second gear speed (=$\gamma 1/\gamma 2$) is "1.733", and the ratio of the transmission gear ratio $\gamma 2$ of the second gear speed to the transmission gear ratio $\gamma 3$ of the third gear speed (=$\gamma 2/\gamma 3$) is "1.383". The ratio of the transmission gear ratio $\gamma 3$ of the third gear speed to the transmission gear ratio $\gamma 4$ of the fourth gear speed (=$\gamma 3/\gamma 4$) is "1.377". The ratio of the transmission gear ratio $\gamma 4$ of the fourth gear speed to the transmission gear ratio $\gamma 5$ of the fifth gear speed (=$\gamma 4/\gamma 5$) is "1.300". The ratio of the transmission gear ratio $\gamma 5$ of the fifth gear speed to the transmission gear ratio $\gamma 6$ of the sixth gear speed (=$\gamma 5/\gamma 6$) is "1.356". The ratio of the transmission gear ratio $\gamma 6$ of the sixth gear speed to the transmission gear ratio $\gamma 7$ of the seventh gear speed (=$\gamma 6/\gamma 7$) is "1.189". Thus, the gear ratios $\gamma$ change substantially in a geometric progression. Furthermore, in the transmission 60, the ratio of the gear ratio $\gamma 1$ of the first gear speed to the gear ratio $\gamma 7$ of the seventh gear speed, that is, the gear ratio width (=$\gamma 1/\gamma 7$), is a relatively great value, that is, "6.909".

Figure 15:
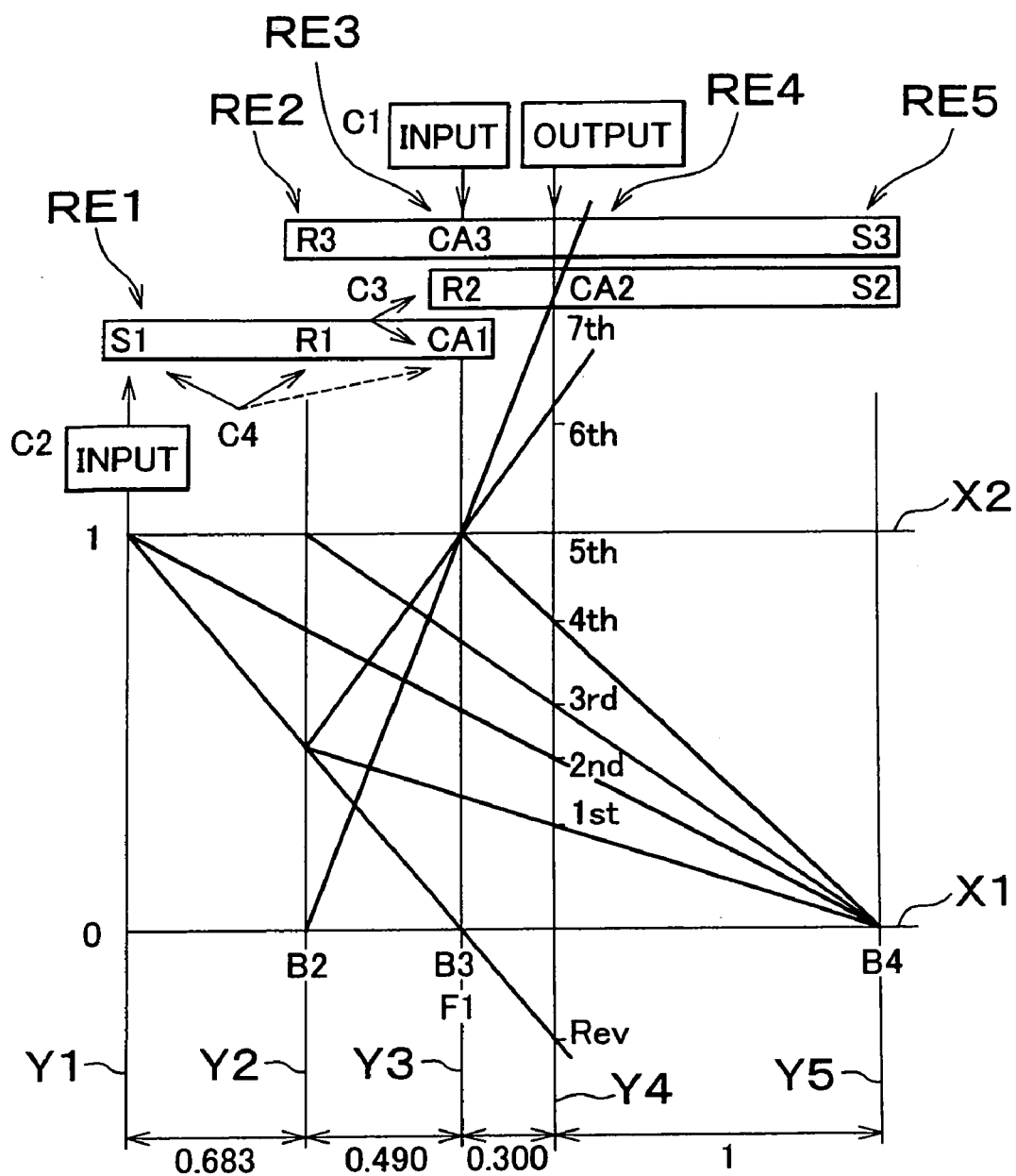
FIG. 15 is an alignment graph illustrating operation of the vehicular planetary gear type multi-speed transmission of the fifth embodiment, corresponding to FIG. 3.

FIG. 15 is an alignment graph of the transmission 60 in this embodiment. In this embodiment, the first rotatable element RE1 is formed by the first sun gear S1, and the second rotatable element RE2 is formed by the first ring gear R1 and the third ring gear R3. The third rotatable element RE3 is formed by the first carrier CA1, the second ring gear R2, and the third carrier CA3. The fourth rotatable element RE4 is formed by the second carrier CA2. The fifth rotatable element RE5 is formed by the second sun gear S2 and the third sun gear S3. The third clutch C3 is provided between the first carrier CA1 and the second ring gear R2 as well as the third carrier CA3. Through the use of this alignment graph, the construction of the transmission 60 of this embodiment can be described as follows. The first rotatable element RE1 (S1) is selectively connectable to the input shaft (input rotatable member) 16 via the second clutch C2. The second rotatable element RE2 (R1, R3) is selectively connectable to the transmission case 12 via the second brake B2. The third rotatable element RE3 (CA1, R2, CA3) is selectively connectable to the input shaft 16 via the first clutch C1, and is selectively connectable to the transmission case 12 via the third brake B3. A portion (CA1) of the third rotatable element RE3 connected to the third brake B3 is selectively connectable, via the third clutch C3, to other portions (R2, CA3) of the rotatable element RE3 connected to the first clutch C1 and to the first rotatable element RE1(S1) via the fourth clutch C4. The fourth rotatable element RE4 (CA2) is connected to the output shaft 24 (output rotatable member) that extends through the third planetary gear unit 22. The fifth rotatable element RE5 (S2, S3) is selectively connectable to the transmission case 12 via the fourth brake B4.

As described above, according to the embodiment, since the combination of the three planetary gear units, that is, the first planetary gear unit 18, the second planetary gear unit 20, and the third planetary gear unit 22, achieves as broad a range of transmission gear ratios as seven forward speeds, it is possible to provide a small-size vehicular planetary gear type multi-speed transmission 60 capable of achieving good high-speed running performance and good uphill starting performance. That is, since the gear ratios γ change substantially in a geometric progression and the gear ratio γR of the reverse gear speed is an intermediate value between the first gear speed and the second gear speed, for example, "3.910", good speed increasing characteristics or good accelerating characteristics based on gear speed shifts can be attained. Furthermore, since the gear ratio width of the transmission 60 (=γ1/γ7) is set at a relatively great value, for example, 6.909, it is possible to provide a small-size vehicular planetary gear type multi-speed transmission 60 capable of achieving good high-speed running performance and good uphill starting performance. In other respects, this embodiment achieves substantially the same advantages as the foregoing embodiments. In the transmission 60 of this embodiment, the gear ratios of the first planetary gear unit 18, the second planetary gear unit 20 and the third planetary gear unit 22 are set as ρ1=0.4177, ρ2=0.300, and ρ3=0.377.

Figure 16:
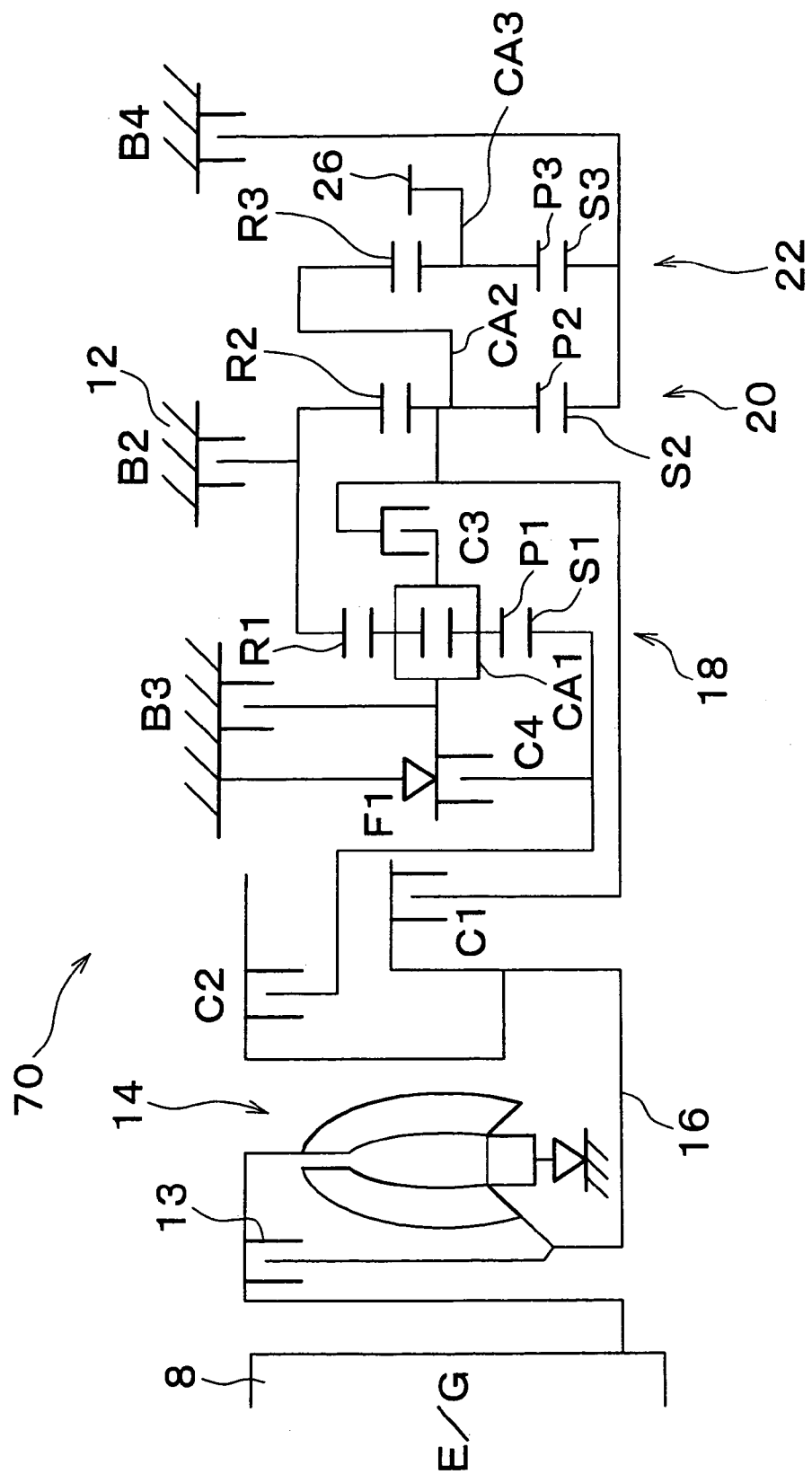
FIG. 16 is a skeleton diagram illustrating a construction of portions of a vehicular planetary gear type multi-speed transmission in accordance with a sixth embodiment of the invention, corresponding to FIG. 1.

FIG. 16 is a skeleton diagram illustrating the construction of a transmission 70 in accordance with a sixth embodiment of the invention. FIG. 17 is a table indicating relationships between the gear speeds of the transmission 70 and actuation of hydraulically-driven friction engagement devices that are needed to establish the individual gear speeds. The sixth embodiment differs from the fifth embodiment in the following respects. In the sixth embodiment, for use as an FF vehicle automatic transmission, an output gear 26 that serves as an output rotatable element is disposed between a third planetary gear unit 22 and a fourth brake B4, and is connected to a third carrier CA3 of the third planetary gear unit 22.

Other portions and structures, and engagement actions are substantially the same as those of the fifth embodiment. The sixth embodiment achieves substantially the same advantages as the fifth embodiment.

Figure 18:
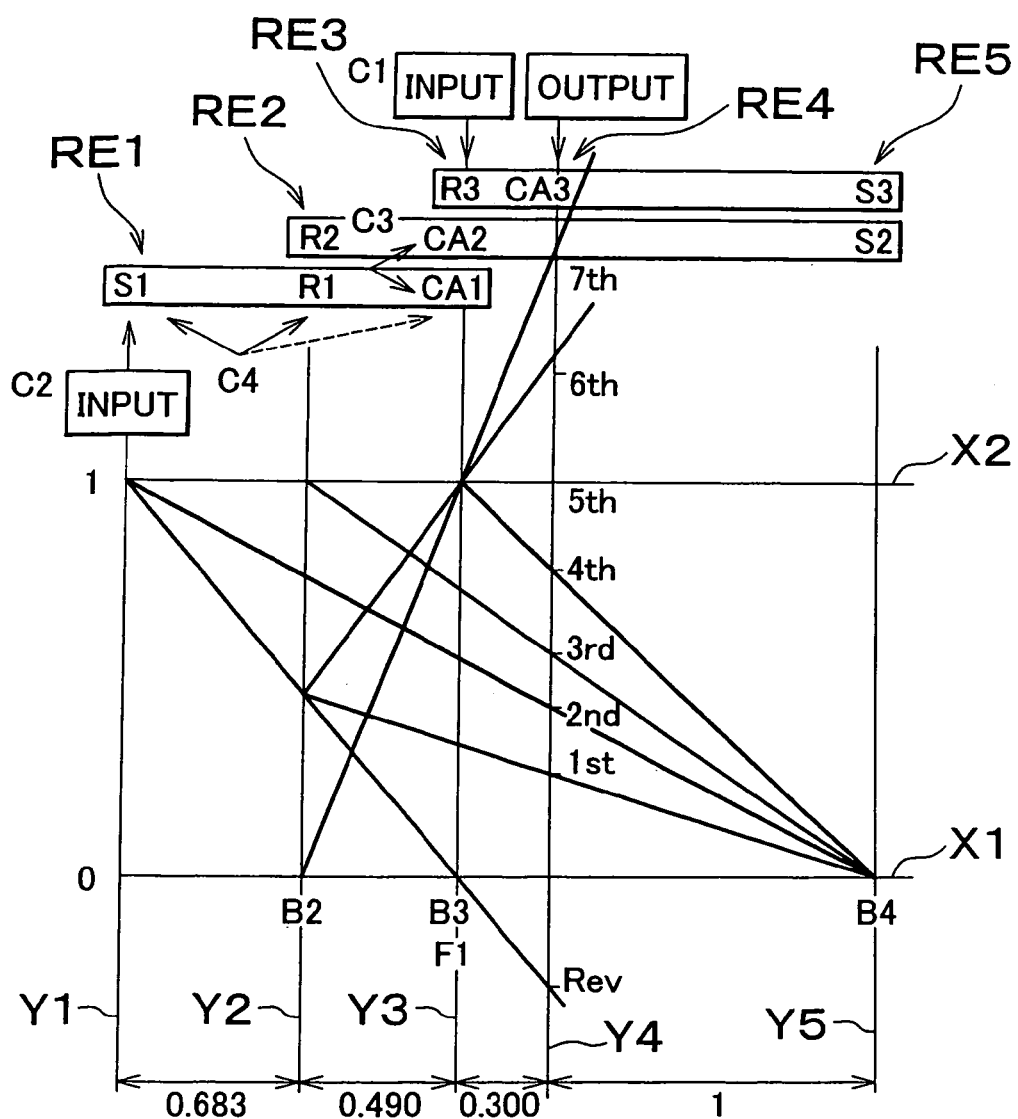
FIG. 18 is an alignment graph illustrating operation of the vehicular planetary gear type multi-speed transmission of the sixth embodiment, corresponding to FIG. 3.

FIG. 18 is an alignment graph of the transmission 70 of this embodiment. In this embodiment, the first rotatable element RE1 is formed by the first sun gear S1, and the second rotatable element RE2 is formed by the first ring gear R1 and the second ring gear R2. The third rotatable element RE3 is formed by the first carrier CA1, the second carrier CA2, and the third ring gear R3. The fourth rotatable element RE4 is formed by the third carrier CA3. The fifth rotatable element RE5 is formed by the second sun gear S2 and the third sun gear S3. The third clutch C3 is provided between the first carrier CA1 and the second carrier CA2 as well as the third ring gear R3. Through the use of this alignment graph, the construction of the transmission 70 of this embodiment can be described as follows. The first rotatable element RE1 (S1) is selectively connectable to the input shaft (input rotatable member) 16 via the second clutch C2. The second rotatable element RE2 (R, R3) is selectively connectable to the transmission case 12 via the second brake B2. The third rotatable element RE3 (CA1, CA2, R3) is selectively connectable to the input shaft 16 via the first clutch C1, and is selectively connectable to the transmission case 12 via the third brake B3. The rotatable element RE3 also is connected to the first rotatable element RE1 (S1) via the fourth clutch C4. A portion (CA1) of the third rotatable element RE3 connected to the third brake B3 and the fourth clutch C4 is selectively connectable, via the third clutch C3, to other portions (CA2, R3) of the rotatable element RE3 connected to the first clutch C1. The fourth rotatable element RE4 (CA3) is connected to the output gear 26 (output rotatable member). The fifth rotatable element RE5 (S2, S3) is selectively connectable to the transmission case 12 via the fourth brake B4.

Figure 19:
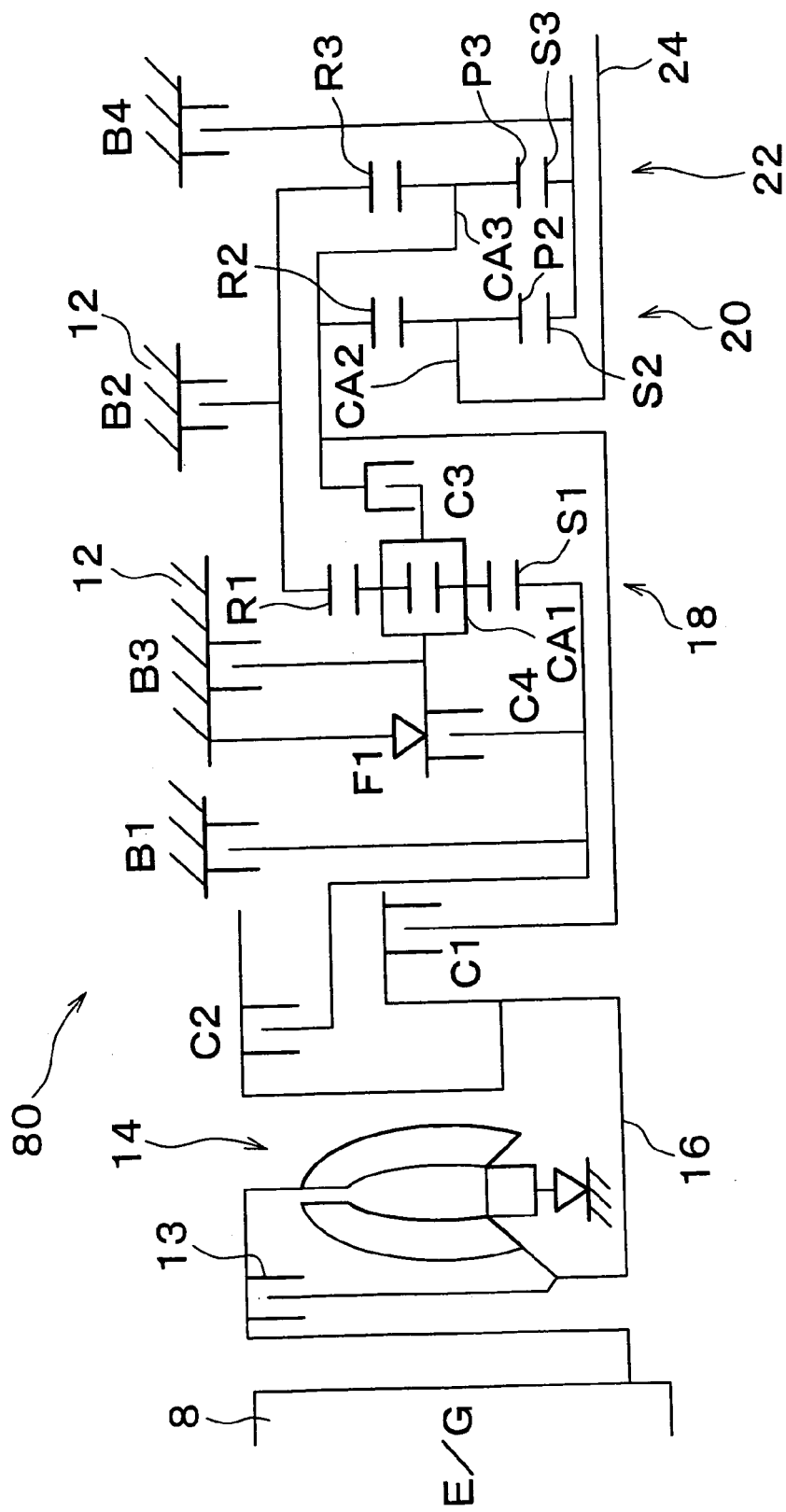
FIG. 19 is a skeleton diagram illustrating a construction of portions of a vehicular planetary gear type multi-speed transmission in accordance with a seventh embodiment of the invention, corresponding to FIG. 1.

FIG. 19 is a skeleton diagram illustrating the construction of a transmission 80 in accordance with a seventh embodiment of the invention. FIG. 20 is a table indicating relationships between the gear speeds of the transmission 80 and actuation of hydraulically-driven friction engagement devices that are needed to establish the individual gear speeds. The transmission 80 of the seventh embodiment differs in construction from the transmission 60 of the fifth embodiment in that a first brake B1 is provided between a first sun gear S1 and a transmission case 12, and also differs in the combinations of friction engagement elements for achieving the fifth and sixth gear speeds. In other respects, the seventh embodiment is substantially the same as the fifth embodiment.

In the transmission 80 of this embodiment, if the second clutch C2, the third brake B3 and the fourth brake B4 are engaged, so that connection is established between the input shaft 16 and the first sun gear S1, and between the first carrier CA1 and the transmission case 12, and between the transmission case 12 and the second sun gear S2 as well as the third sun gear S3, respectively, then the first gear speed of a gear ratio γ1 is achieved. The transmission gear ratio γ1 has a maximum ratio value, for example, "4.073".

If the second clutch C2, the third clutch C3 and the fourth brake B4 are engaged, so that connection is established between the input shaft 16 and the first sun gear S1, and between the first carrier CA1 and the second ring gear R2 as well as the third carrier CA3, and between the transmission case 12 and the second sun gear S2 as well as the third sun gear S3, respectively, then the second gear speed of a transmission gear ratio γ2 that is smaller than the gear ratio γ1 of the first gear speed is established. The gear ratio γ2 of the second speed is, for example, about "2.322".

If the second clutch C2, the fourth clutch C4 and the fourth brake B4 are engaged to establish connections between the input shaft 16 and the first sun gear S1, and between the first sun gear S1 and the first carrier CA1, and between the transmission case 12 and the second sun gear S2 as well as the third sun gear S3, respectively, the third gear speed of a gear ratio γ3 that is smaller than the gear ratio γ2 of the second gear speed is established. The gear ratio γ3 of the third speed is, for example, about "1.753".

If the first clutch C1 and the fourth brake B4 are engaged to establish connections between the input shaft 16 and the second ring gear R2 as well as the third carrier CA3, and between the transmission case 12 and the second sun gear S2 as well as the third sun gear S3, respectively, the fourth gear speed of a gear ratio γ4 that is smaller than the gear ratio γ3 of the third gear speed is established. The gear ratio γ4 of the fourth speed is, for example, about "1.323".

If the first clutch C1, the third clutch C3 and the fourth clutch C4 are engaged to establish connections between the input shaft 16 and the second ring gear R2 as well as the third carrier CA3, and between the first carrier CA1 and the second ring gear R2 as well as the third carrier CA3, and between the first sun gear S1 and the first carrier CA1, respectively, the fifth gear speed of a gear ratio γ5 that is smaller than the gear ratio γ4 of the fourth gear speed is established. The gear ratio γ5 of the fifth speed is, for example, about "1.000".

If the first clutch C1, the third clutch C3 and the first brake B1 are engaged to establish connections between the input shaft 16 and the second ring gear R2 as well as the third carrier CA3, and between the first carrier CA1 and the second ring gear R2 as well as the third carrier CA3, and between the first sun gear S1 and the transmission case 12, respectively, the sixth gear speed of a gear ratio γ6 that is smaller than the gear ratio γ5 of the fifth gear speed is established. The gear ratio γ6 of the sixth speed is, for example, about "0.756".

If the first clutch C1 and the second brake B2 are engaged to establish connections between the input shaft 16 and the second ring gear R2 as well as the third carrier CA3, and between the transmission case 12 and the first ring gear R1 as well as the third ring gear R3, respectively, the seventh gear speed of a gear ratio γ7 that is smaller than the gear ratio γ6 of the sixth gear speed is established. The gear ratio γ7 of the seventh speed is, for example, about "0.571".

If the second clutch C2, the third clutch C3 and the third brake B3 are engaged to establish connections between the input shaft 16 and the first sun gear S1, and between the first carrier CA1 and the second ring gear R2 as well as the third carrier CA3, and between the first carrier CA1 and the transmission case 12, respectively, the reverse gear speed of a gear ratio γR that is between the gear ratio γ1 of the first speed and the gear ratio γ2 of the second speed is established. The gear ratio γR of the reverse speed is, for example, about "3.093".

The gear ratio ρ1 (=0.4304) of the first planetary gear unit 18, the gear ratio ρ2 (=0.323) of the second planetary gear unit 20, and the gear ratio ρ3 (=0.325) of the third planetary gear unit 22 are set so that the aforementioned transmission gear ratios are achieved.

In the transmission 80, the ratio of the transmission gear ratio γ1 of the first gear speed to the transmission gear ratio γ2 of the second gear speed (=γ1/γ2) is "1.754", and the ratio of the transmission gear ratio γ2 of the second gear speed to the transmission gear ratio γ3 of the third gear speed (=γ2/γ3) is "1.325". The ratio of the transmission gear ratio γ3 of the third gear speed to the transmission gear ratio γ4 of the fourth gear speed (=γ3/γ4) is "1.325". The ratio of the transmission gear ratio γ4 of the fourth gear speed to the transmission gear ratio γ5 of the fifth gear speed (=γ4/γ5) is "1.323". The ratio of the transmission gear ratio γ5 of the fifth gear speed to the transmission gear ratio γ6 of the sixth gear speed (=γ5/γ6) is "1.323". The ratio of the transmission gear ratio γ6 of the sixth gear speed to the transmission gear ratio γ7 of the seventh gear speed (=γ/γ7) is "1.323". Thus, the gear ratios γ change substantially in a geometric progression. Furthermore, in the transmission 80, the ratio of the gear ratio γ1 of the first gear speed to the gear ratio γ7 of the seventh gear speed, that is, the gear ratio width (=γ1/γ7), is a relatively great value, that is, "7.132".

Figure 21:
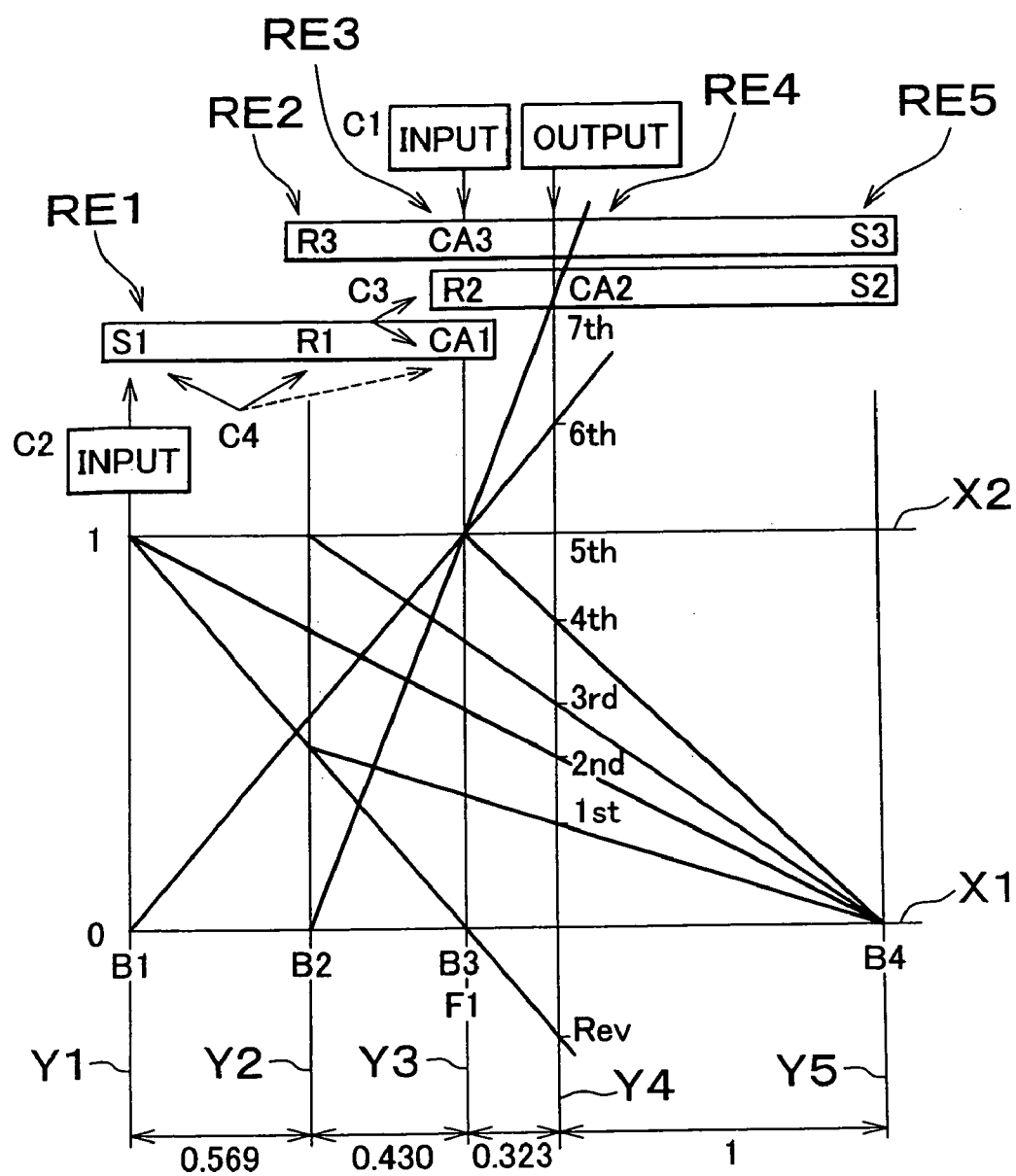
FIG. 21 is an alignment graph illustrating operation of the vehicular planetary gear type multi-speed transmission of the seventh embodiment, corresponding to FIG. 3.

FIG. 21 is an alignment graph of the transmission 80. In this embodiment, the first rotatable element RE1 is formed by the first sun gear S1, and the second rotatable element RE2 is formed by the first ring gear R1 and the third ring gear R3. The third rotatable element RE3 is formed by the first carrier CA1, the second ring gear R2, and the third carrier CA3. The fourth rotatable element RE4 is formed by the second carrier CA2. The fifth rotatable element RE5 is formed by the second sun gear S2 and the third sun gear S3.

The third clutch C3 is provided between the first carrier CA1 and the second ring gear R2 as well as the third carrier CA3. Through the use of this alignment graph, the construction of the transmission 80 of this embodiment can be described as follows. The first rotatable element RE1 (S1) is selectively connectable to the input shaft (input rotatable member) 16 via the second clutch C2, and is selectively connectable to the transmission case 12 via the first brake B1. The second rotatable element RE2 (R1, R3) is selectively connectable to the transmission case 12 via the second brake B2. The third rotatable element RE3 (CA1, R2, CA3) is selectively connectable to the input shaft 16 via the first clutch C1, and is selectively connectable to the transmission case 12 via the third brake B3. The third rotatable element RE3 is also selectively connectable to the first rotatable element RE1 (S1) via the fourth clutch C4. A portion (CA1) of the third rotatable element RE3 connected to the third brake B3 and the fourth clutch C4 is selectively connectable, via the third clutch C3, to other portions (R2, CA3) of the rotatable element RE3 connected to the first clutch C1. The fourth rotatable element RE4 (CA2) is connected to the output gear 26 (output rotatable member). The fifth rotatable element RE5 (S2, S3) is selectively connectable to the transmission case 12 via the fourth brake B4.

As described above, according to the embodiment, since the combination of the three planetary gear units, that is, the first planetary gear unit 18, the second planetary gear unit 20, and the third planetary gear unit 22, achieves as broad a range of transmission gear ratios as seven forward speeds, it is possible to provide a small-size vehicular planetary gear type multi-speed transmission 80 capable of achieving good high-speed running performance and good uphill starting performance. That is, since the gear ratios γ change substantially in a geometric progression and the gear ratio γR of the reverse gear speed is an intermediate value between the first gear speed and the second gear speed, for example, "3.093", good speed increasing characteristics or good accelerating characteristics based on gear speed shifts can be attained. Furthermore, since the gear ratio width of the transmission 80 (=γ1/γ7) is set at a relatively great value, for example, 7.132, it is possible to provide a small-size vehicular planetary gear type multi-speed transmission 80 capable of achieving good high-speed running performance and good uphill starting performance. In other respects, this embodiment achieves substantially the same advantages as the fifth embodiment.

Figure 22:
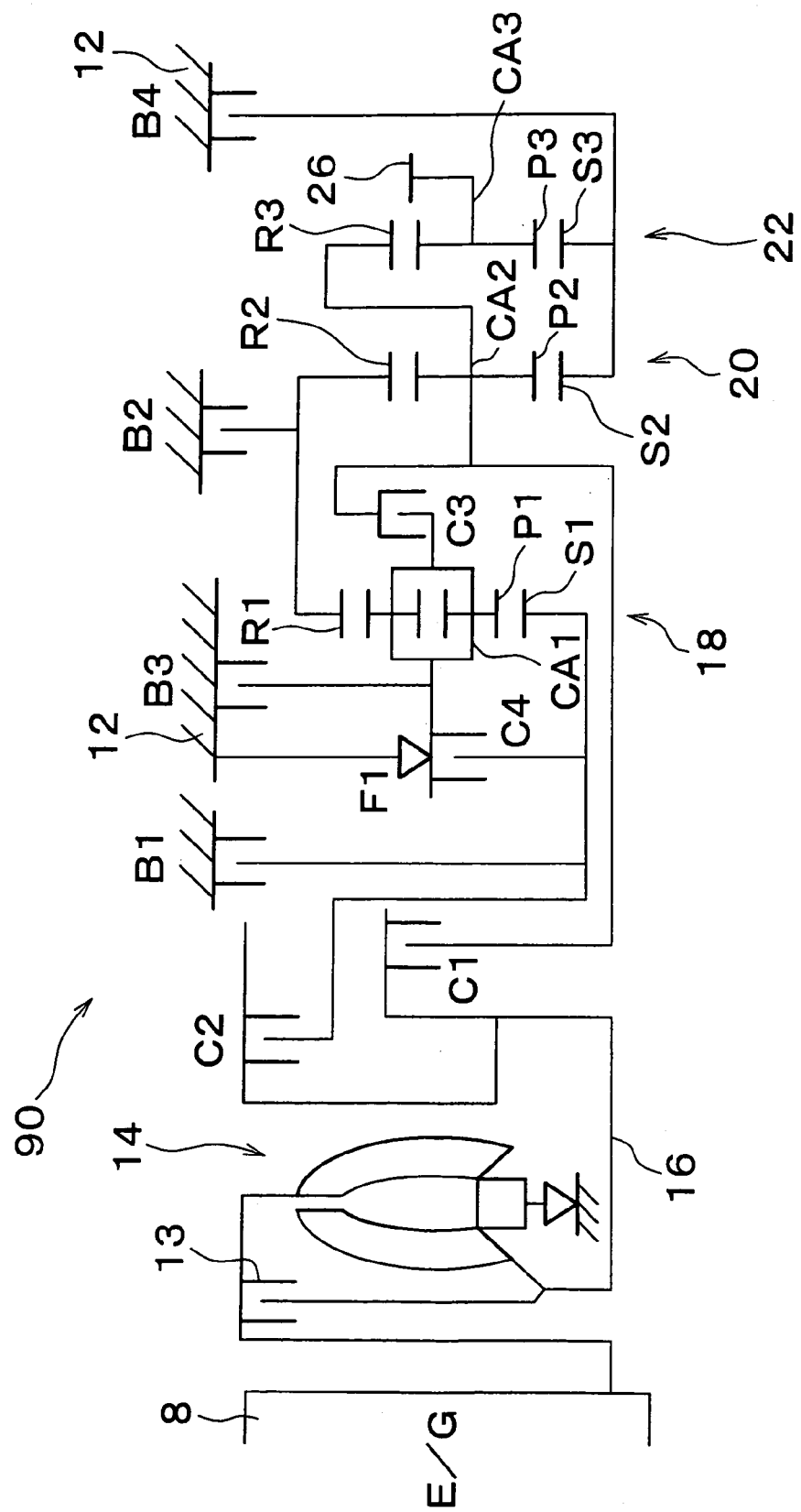
FIG. 22 is a skeleton diagram illustrating a construction of portions of a vehicular planetary gear type multi-speed transmission in accordance with an eighth embodiment of the invention, corresponding to FIG. 1.

FIG. 22 is a skeleton diagram illustrating the construction of a transmission 90 in accordance with an eighth embodiment of the invention. FIG. 23 is a table indicating relationships between the gear speeds of the transmission 90 and actuation of hydraulically-driven friction engagement devices that are needed to establish the individual gear speeds. The transmission 90 of the eighth embodiment differs in construction from the transmission 70 of the sixth embodiment in that a first brake B1 is provided between a first sun gear S1 and a transmission case 12, and also differs in the combination of friction engagement devices for achieving the fifth and sixth gear speeds. In other respects, the eighth embodiment is substantially the same as the sixth embodiment. Therefore, the eighth embodiment achieves substantially the same advantages as the sixth embodiment. The combinations of friction engagement devices for achieving the gear speeds other than the fifth and sixth gear speeds are the same as shown in FIGS. 14 and 17.

Figure 24:
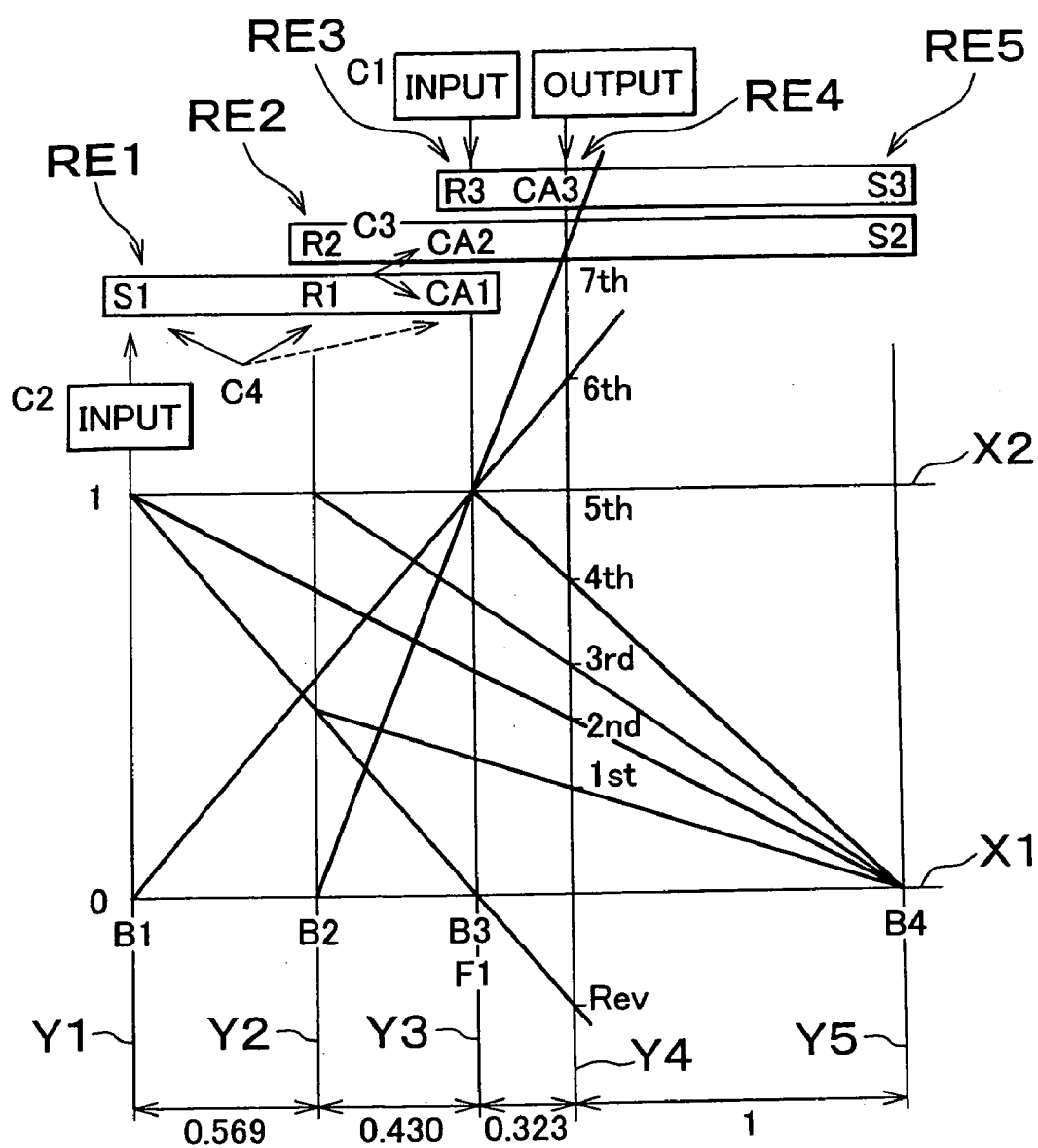
FIG. 24 is an alignment graph illustrating operation of the vehicular planetary gear type multi-speed transmission of the eighth embodiment, corresponding to FIG. 3.

FIG. 24 is an alignment graph of the transmission 90. In this embodiment, the first rotatable element RE1 is formed by the first sun gear S1, and the second rotatable element RE2 is formed by the first ring gear R1 and the second ring gear R2. The third rotatable element RE3 is formed by the first carrier CA1, the second carrier CA2, and the third ring gear R3. The fourth rotatable element RE4 is formed by the third carrier CA3. The fifth rotatable element RE5 is formed by the second sun gear S2 and the third sun gear S3. The third clutch C3 is provided between the first carrier CA1 and the second carrier CA2 as well as the third ring gear R3. Through the use of this alignment graph, the construction of the transmission 90 of this embodiment can be described as follows. The first rotatable element RE1 (S1) is selectively connectable to the input shaft (input rotatable member) 16 via the second clutch C2, and is selectively connectable to the transmission case 12 via the first brake B1. The second rotatable element RE2 (R1, R2) is selectively connectable to the transmission case 12 via the second brake B2. The third rotatable element RE3 (CA1, CA2, CA3) is selectively connectable to the input shaft 16 via the first clutch C1, and is selectively connectable to the transmission case 12 via the third brake B3. The third rotatable element RE3 is also selectively connectable to the first rotatable element RE1 (S1) via the fourth clutch C4. A portion (CA1) of the third rotatable element RE3 connected to the third brake B3 and the fourth clutch C4 is selectively connectable, via the third clutch C3, to other portions (CA2, CA3) of the rotatable element RE3 connected to the first clutch C1. The fourth rotatable element RE4 (CA3) is connected to the output gear (output rotatable member) 26. The fifth rotatable element RE5 (S2, S3) is selectively connectable to the transmission case 12 via the fourth brake B4.

Figure 25:
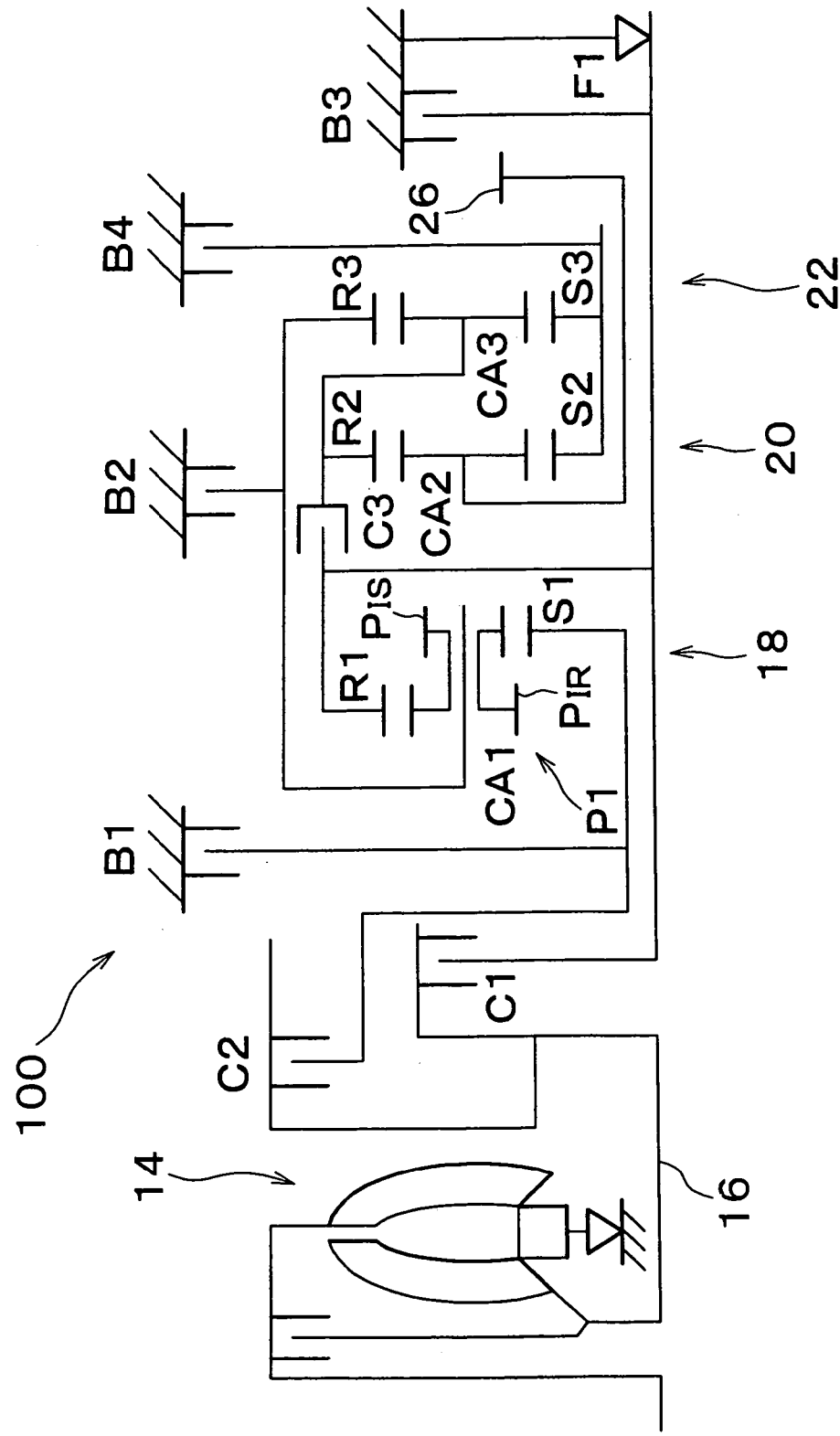
FIG. 25 is a skeleton diagram illustrating a construction of portions of a vehicular planetary gear type multi-speed transmission in accordance with an ninth embodiment of the invention, corresponding to FIG. 1.

FIG. 25 is a skeleton diagram illustrating the construction of a transmission 100 in accordance with a ninth embodiment of the invention. FIG. 26 is a table indicating relationships between the gear speeds of the transmission 100 and actuation of hydraulically-driven friction engagement devices that are needed to establish the individual gear speeds. The transmission 100 of the ninth embodiment differs from the transmission 40 (FIG. 7) of the third embodiment in the following respects. In the transmission 100 of the ninth embodiment, a first brake B1 is provided between a first sun gear S1 of a first planetary gear unit 18 and a transmission case 12. The first sun gear S1 is selectively connectable to an input shaft 16 via a second clutch C2. A first ring gear R1 of the first planetary gear unit 18 is selectively connectable to a second ring gear R2 and a third carrier CA3 via a third clutch C3, and is also selectively connectable to the input shaft 16 via a first clutch C1. A second carrier CA2 is connected to an output gear 26. Planetary gears P1 of the first planetary gear unit 18 are formed by stepped pinions including gear portions P1S that mesh with the first sun gear S1, and gear portions P1R that mesh with the first ring gear R1. The gear portions P1S and the gear portions P1R are different from each other in diameter or number of teeth.

In other respects, the transmission 100 is constructed substantially in the same fashion as the transmission 40 of the third embodiment. Therefore, in the ninth embodiment, the combinations of friction engagement devices for achieving the gear speeds are substantially the same as those in the third embodiment. The ninth embodiment achieves substantially the same advantages as the third embodiment.

Since the planetary gears P1 of the first planetary gear unit 18 are formed by stepped pinions, the transmission 100 has an advantages of reducing the rotational speed of the planetary gears P1. In this embodiment, the gear portions P1S of the planetary gears P1 are smaller in diameter than the gear portions P1R. However, this size relationship may be reversed.

Figure 27:
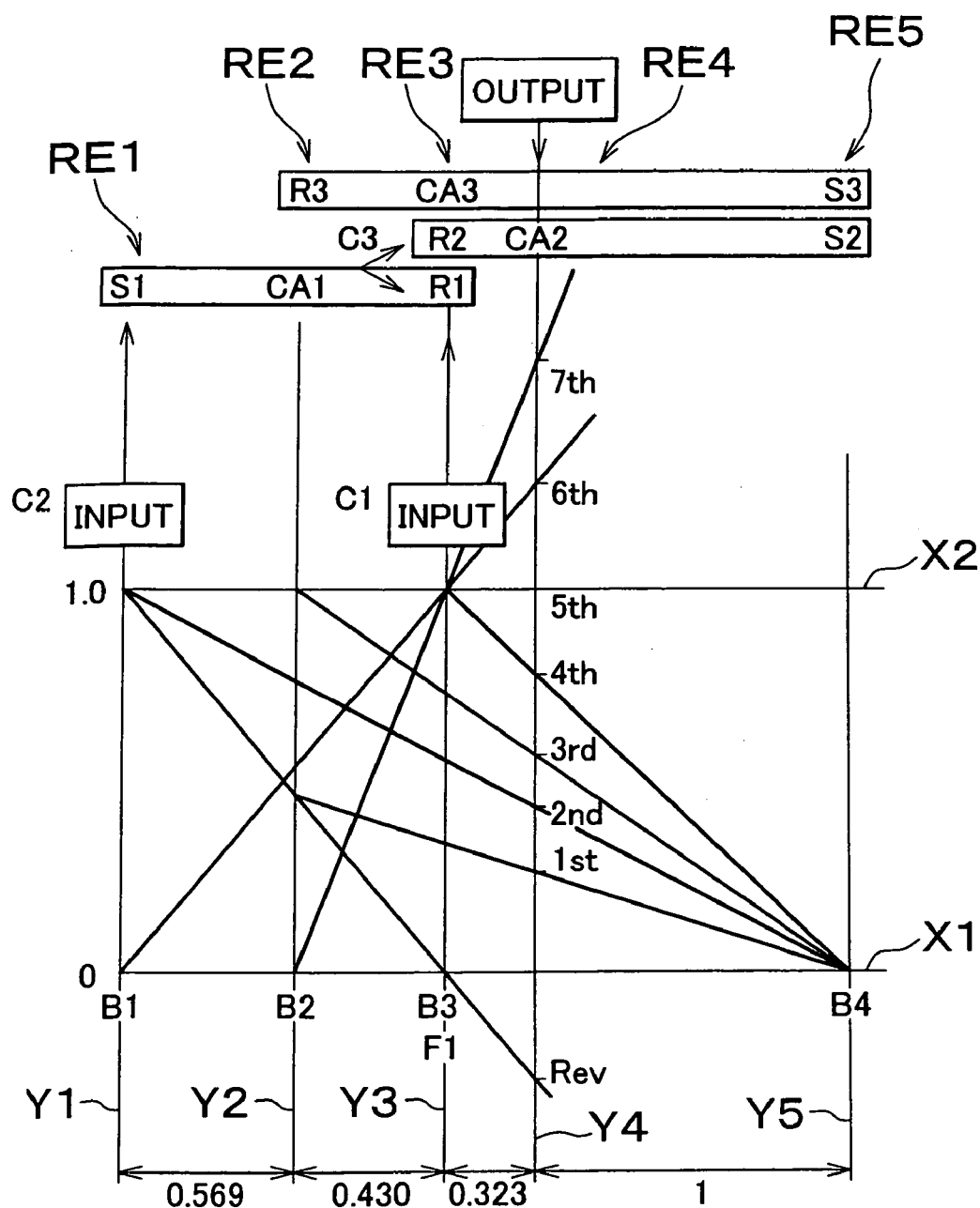
FIG. 27 is an alignment graph illustrating operation of the vehicular planetary gear type multi-speed transmission of the ninth embodiment, corresponding to FIG. 3.

FIG. 27 is an alignment graph of the transmission 100. In this embodiment, the first rotatable element RE1 is formed by the first sun gear S1, and the second rotatable element RE2 is formed by the first carrier CA1 and the third ring gear R3. The third rotatable element RE3 is formed by the first ring gear R1, the second ring gear R2, and the third carrier CA3. The fourth rotatable element RE4 is formed by the second carrier CA2. The fifth rotatable element RE5 is formed by the second sun gear S2 and the third sun gear S3. The third clutch C3 is provided between the first ring gear R1 and the second ring gear R2 as well as the third carrier CA3. Through the use of this alignment graph, the construction of the transmission 100 of this embodiment can be described as follows. The first rotatable element RE1 (S1) is selectively connectable to the input shaft (input rotatable member) 16 via the second clutch C2, and is selectively connectable to the transmission case 12 via the first brake B1. The second rotatable element RE2 (CA1, R3) is selectively connectable to the transmission case 12 via the second brake B2. The third rotatable element RE3 (R1, R2, CA3) is selectively connectable to the input shaft 16 via the first clutch C1, and is selectively connectable to the transmission case 12 via the third brake B3 and the one-way clutch F1 that are disposed in parallel. A portion (R1) of the third rotatable element RE3 connected to the third brake B3 is selectively connectable, via the third clutch C3, to other portions (CA3, R2) of the rotatable element RE3. The fourth rotatable element RE4 (CA2) is connected to the output gear (output rotatable member) 26. The fifth rotatable element RE5 (S2, S3) is selectively connectable to the transmission case 12 via the fourth brake B4.

Figure 28:
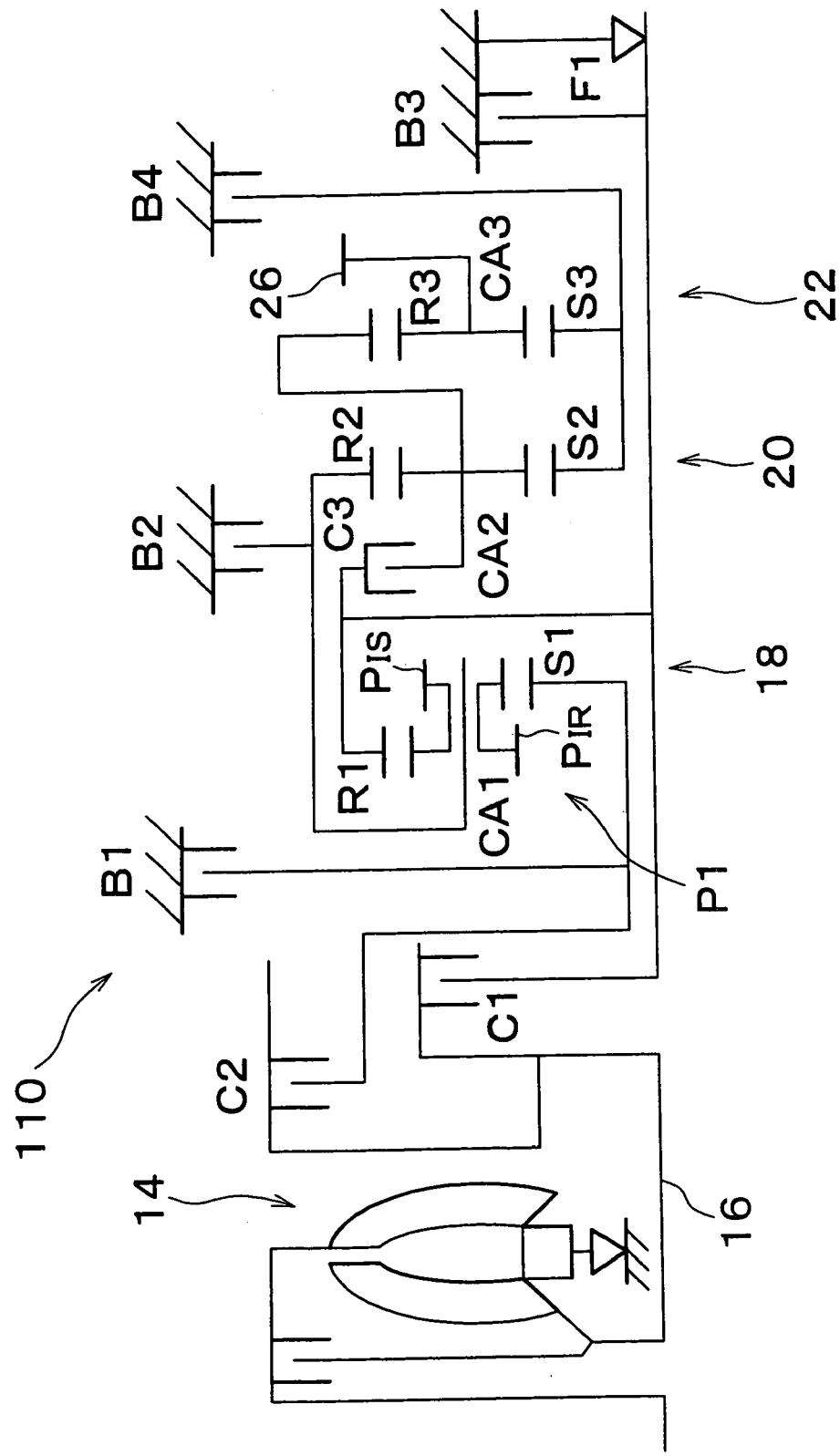
FIG. 28 is a skeleton diagram illustrating a construction of portions of a vehicular planetary gear type multi-speed transmission in accordance with a tenth embodiment of the invention, corresponding to FIG. 1.

FIG. 28 is a skeleton diagram illustrating the construction of a transmission 110 in accordance with a tenth embodiment of the invention. FIG. 29 is a table indicating relationships between the gear speeds of the transmission 110 and actuation of hydraulically-driven friction engagement devices that are needed to establish the individual gear speeds. The transmission 110 of the tenth embodiment differs from the transmission 40 (FIG. 7) of the third embodiment in the following respects. In the transmission 110 of the tenth embodiment, a first brake B1 is provided between a first sun gear S1 of a first planetary gear unit 18 and a transmission case 12. The first sun gear S1 is selectively connectable to an input shaft 16 via a second clutch C2. A first ring gear R1 of the first planetary gear unit 18 is selectively connectable to a second carrier CA2 and a third ring gear R3 via a third clutch C3, and is selectively connectable to an input shaft 16 via a first clutch C1. A third carrier CA3 is connected to an output gear 26. The first ring gear R1 is selectively connectable to the input shaft 16 via the first clutch C1. Planetary gears P1 of the first planetary gear unit 18 are formed by stepped pinions including gear portions P1S that mesh with the first sun gear S1, and gear portions P1R that mesh with the first ring gear R1. The gear portions P1S and the gear portions P1R are different from each other in diameter or number of teeth (in this embodiment, the gear portions P1S has a less number of teeth than the gear portions P1R).

In other respects, the transmission 110 is constructed substantially in the same fashion as in the third embodiment. Therefore, in the tenth embodiment, the combinations of friction engagement devices for achieving the gear speeds are basically the same as those in the third embodiment. The tenth embodiment achieves substantially the same advantages as the third embodiment. Since the planetary gears P1 of the first planetary gear unit 18 are formed by stepped pinions, the transmission 10 of this embodiment also has an advantages of reducing the rotational speed of the planetary gears P1. Although in this embodiment, the gear portions P1S of the planetary gears P1 are smaller in diameter than the gear portions P1R, this size relationship may be reversed.

Figure 30:
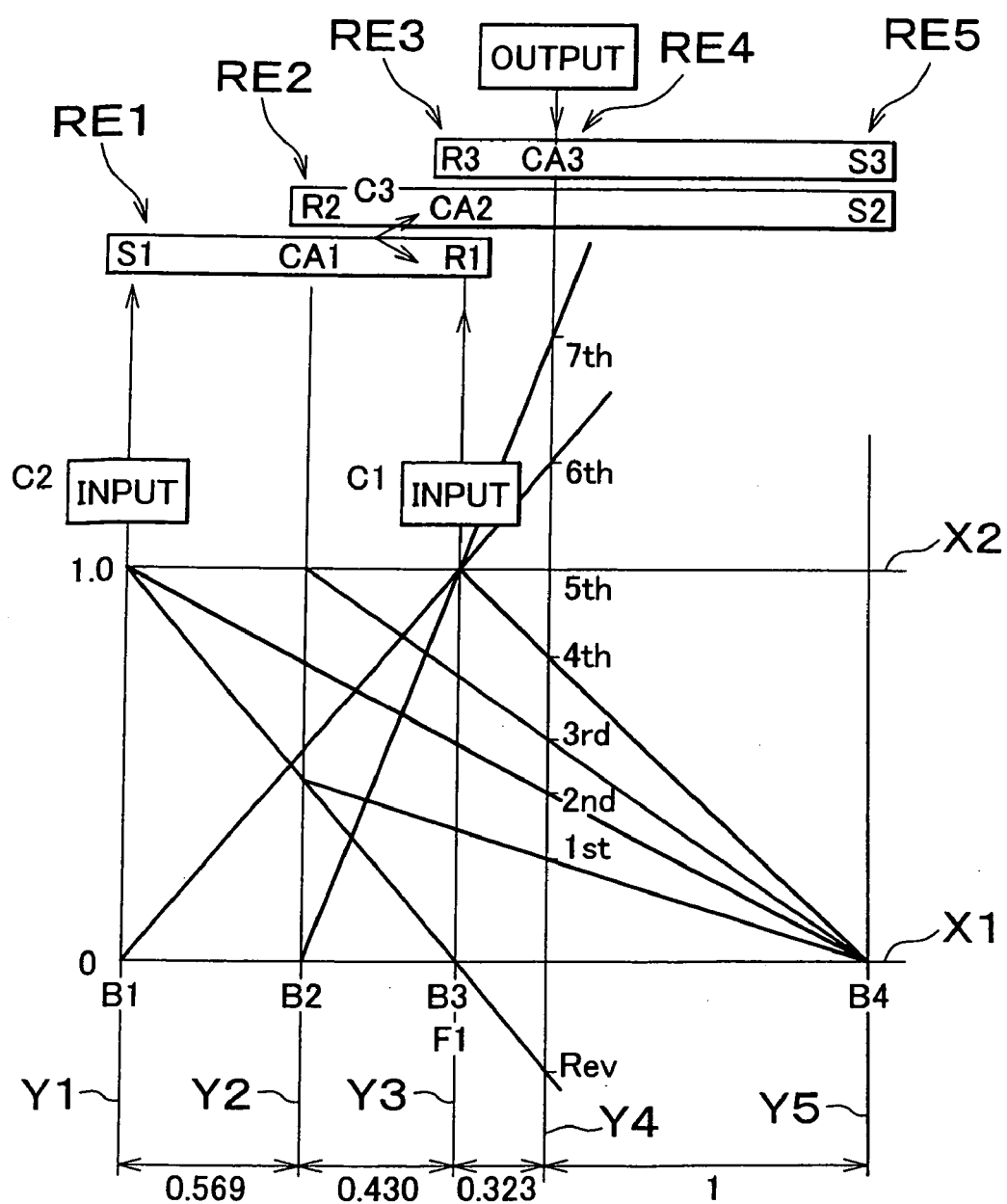
FIG. 30 is an alignment graph illustrating operation of the vehicular planetary gear type multi-speed transmission of the tenth embodiment, corresponding to FIG. 3.

FIG. 30 is an alignment graph of the transmission 110. In this embodiment, the first rotatable element RE1 is formed by the first sun gear S1, and the second rotatable element RE2 is formed by the first carrier CA1 and the second ring gear R2. The third rotatable element RE3 is formed by the first ring gear R1, the second carrier CA2, and the third ring gear R3. The fourth rotatable element RE4 is formed by the third carrier CA3. The fifth rotatable element RE5 is formed by the second sun gear S2 and the third sun gear S3. The third clutch C3 is provided between the first ring gear R1 and the second carrier CA2 as well as the third ring gear R3. Through the use of this alignment graph, the construction of the transmission 110 of this embodiment can be described as follows. The first rotatable element RE1 (S1) is selectively connectable to the input shaft (input rotatable member) 16 via the second clutch C2, and is selectively connectable to the transmission case 12 via the first brake B1. The second rotatable element RE2 (CA1, R2) is selectively connectable to the transmission case 12 via the second brake B2. The third rotatable element RE3 (R1, CA2, R3) is selectively connectable to the input shaft 16 via the first clutch C1, and is selectively connectable to the transmission case 12 via the third brake B3 and the one-way clutch F1 that are disposed in parallel. A portion (R1) of the third rotatable element RE3 connected to the third brake B3 is selectively connectable, via the third clutch C3, to other portions (CA2, R3) of the rotatable element RE3. The fourth rotatable element RE4 (CA3) is connected to the output gear (output rotatable member) 26. The fifth rotatable element RE5 (S2, S3) is selectively connectable to the transmission case 12 via the fourth brake B4.

While the embodiments of the invention have been described with reference to the drawings, the embodiments are merely illustrative, and the invention is applicable to other forms or constructions.

For example, although in FIGS. 14 and 17 illustrating engagement of friction devices in the transmissions 60 and 70, the first clutch C1, the second clutch C2 and the fourth clutch C4 are engaged in order to achieve the fifth speed having a gear ratio γ of "1", it is also possible to engage the first clutch C1, the third clutch C3 and the fourth clutch C4 instead. Furthermore, although in FIGS. 20 and 23 illustrating engagement of friction devices in the transmissions 80 and 90, the first clutch C1, the third clutch C3 and the fourth clutch C4 are engaged in order to achieve the fifth speed having a gear ratio γ of "1", it is also possible to engage the first clutch C1, the second clutch C2 and the fourth clutch C4 instead. In short, it is appropriate to engage at least three of the first clutch C1, the second clutch C2, the third clutch C3 and the fourth clutch C4 so as to rotate elements of the first planetary gear unit 18, the second planetary gear unit 20 and the third planetary gear unit 22 together.

Furthermore, in the transmissions 10, 30, 40, 50, 60, 70, 80, 90, 100, 110 in the foregoing embodiments, at least one of the first to fourth clutches C1 to C4 and the first to fourth brakes B1 to B4 may be accompanied with a one-way clutch disposed in series or parallel. This will facilitate gear shift control. Furthermore, it is also possible to replace at least one of the first to fourth clutches C1 to C4 and the first to fourth brakes B1 to B4 with a one-way clutch. This modification still allows gear speed shift.

Although in the foregoing embodiments, the torque converter 14 is provided between the engine and the input shaft 16, the torque converter 14 may be replaced by a fluid coupling, a magnetic particle-type electromagnetic clutch, a multi-plate or single-plate hydraulic clutch, or the like.

Furthermore, although in the foregoing alignment graphs, the vertical lines Y1, Y2, Y3, Y4, Y5 corresponding to the rotatable elements RE1, RE2, RE3, RE4, RE5 are sequentially arranged from left to right, the vertical lines may instead be sequentially arranged from right to left. Although the horizontal line X2 corresponding to the rotational speed of "1" is placed above the horizontal line X1 corresponding to the zero rotational speed, the horizontal line X2 may instead be placed below the horizontal line X1.

While the embodiments of the invention have been described in detail with reference to the drawings, the embodiments are mere illustrative, and the invention may be carried out with various modifications and improvements based on the knowledge of those skilled in the art.

What is claimed is:

1. An automatic transmission that changes a rotational speed of an input rotatable element in a stepwise manner and outputs a rotation of an output rotatable member, comprising:

five rotatable elements formed based on interconnection of some of a first sun gear, a first carrier and a first ring gear of a first planetary gear unit, and a second sun gear, a second carrier and a second ring gear of a second planetary gear unit, and a third sun gear, a third carrier and a third ring gear of a third planetary gear unit wherein, where the five rotatable elements are termed a first rotatable element, a second rotatable element, a third rotatable element, a fourth rotatable element, and a fifth rotatable element, the first rotatable element is selectively connectable to the input rotatable element via a second clutch, and the second rotatable element is selectively connectable to a non-rotatable member via a second brake, and the third rotatable element is selectively connectable to the first rotatable element via a fourth clutch, and is selectively connectable to the non-rotatable member via a third brake, and is selectively connectable to the input rotatable element via a first clutch, and a portion of the third rotatable element connected to the fourth clutch and the third brake and a portion of the third rotatable element connected to the first clutch are selectively connectable to each other via a third clutch, and the fourth rotatable element is connected to the output rotatable member, and the fifth rotatable element is selectively connectable to the non-rotatable member via a fourth brake, and wherein said rotatable elements, said brakes and said clutches are constructed and arranged such that engagement of the second clutch, the third brake and the fourth brake establishes a first gear speed having a greatest transmission gear ratio, and engagement of the second clutch, the third clutch and the fourth brake establishes a second gear speed of a transmission gear ratio that is smaller than the transmission gear ratio of the first gear speed, and engagement of the second clutch, the fourth clutch and the fourth brake establishes a third gear speed of a transmission gear ratio that is smaller than the transmission gear ratio of the second gear speed, and engagement of the first clutch and the fourth brake establishes a fourth gear speed of a transmission gear ratio that is smaller than the transmission gear ratio of the third gear speed, and engagement of at least three of the first clutch, the second clutch, the third clutch and the fourth clutch establishes a fifth gear speed of a transmission gear ratio that is smaller than the transmission gear ratio of the fourth gear speed, and engagement of the first clutch, the second clutch and the third brake establishes a sixth gear speed of a transmission gear ratio that is smaller than the transmission gear ratio of the fifth gear speed, and engagement of the first clutch and the second brake establishes a seventh gear speed of a transmission gear ratio that is smaller than the transmission gear ratio of the sixth gear speed.

2. The automatic transmission according to claim 1, wherein the first planetary gear unit, the second planetary gear unit and the third planetary gear unit are coaxially and sequentially disposed, the first rotatable element is formed by the first sun gear, and the second rotatable element is formed by the first ring gear and the third ring gear, and the third rotatable element is formed by the first carrier, the second ring gear and the third carrier, and the fourth rotatable element is formed by the second carrier, and the fifth rotatable element is formed by the second sun gear and the third sun gear, and the third clutch is provided between the first carrier and the second ring gear as well as the third carrier.

3. The automatic transmission according to claim 1, wherein that the first planetary gear unit, the second planetary gear unit and the third planetary gear unit are coaxially and sequentially disposed, the first rotatable element is formed by the first sun gear, and the second rotatable element is formed by the first ring gear and the second ring gear, and the third rotatable element is formed by the first carrier, the second carrier and the third ring gear, and the fourth rotatable element is formed by the third carrier, and the fifth rotatable element is formed by the second sun gear and the third sun gear, and that the third clutch is provided between the first carrier and the second carrier as well as the third ring gear.

4. The automatic transmission according to of claim 1, wherein engagement of the second clutch, the third clutch and the third brake establishes a reverse gear speed.

5. The automatic transmission according to claim 1, wherein the first planetary gear unit is a double-pinion planetary gear unit that has a pair of planetary gears that are meshed with each other and are rotatably supported by the first carrier.

6. The automatic transmission according to claim 1, wherein an output of an engine is input to the input rotatable element via a torque converter.

7. The automatic transmission according to claim 1, wherein the third brake includes a one-way clutch provided in parallel to the third brake.

8. The automatic transmission according to claim 1, wherein the automatic transmission is for a vehicle.

\* \* \* \* \*